US009628190B2

(12) United States Patent
Urino et al.

(10) Patent No.: US 9,628,190 B2
(45) Date of Patent: Apr. 18, 2017

(54) OPTICAL TRANSMITTER AND OPTICAL COMMUNICATION DEVICE

(71) Applicant: NEC Corporation, Minato-ku, Tokyo (JP)

(72) Inventors: Yutaka Urino, Tokyo (JP); Ichiro Ogura, Tokyo (JP); Masashige Ishizaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 157 days.

(21) Appl. No.: 14/417,595

(22) PCT Filed: Jul. 29, 2013

(86) PCT No.: PCT/JP2013/070465
§ 371 (c)(1),
(2) Date: Jan. 27, 2015

(87) PCT Pub. No.: WO2014/021258
PCT Pub. Date: Feb. 6, 2014

(65) Prior Publication Data
US 2015/0155945 A1    Jun. 4, 2015

(30) Foreign Application Priority Data

Jul. 30, 2012 (JP) ................................. 2012-168219

(51) Int. Cl.
*H04B 17/00* (2015.01)
*H04B 10/516* (2013.01)
(Continued)

(52) U.S. Cl.
CPC ......... *H04B 10/516* (2013.01); *H04B 10/032* (2013.01); *H04B 10/0795* (2013.01); *H04B 10/50* (2013.01); *G02B 6/3546* (2013.01)

(58) Field of Classification Search
CPC ....... H01L 2924/00; H01L 2924/12041; H01L 2924/12042; H01L 2924/12043;
(Continued)

(56) References Cited

U.S. PATENT DOCUMENTS 5,568,575 A   10/1996 Sato
6,137,613 A * 10/2000 Ushirozawa ......... H04B 10/572
398/1
(Continued)

FOREIGN PATENT DOCUMENTS

CN   101813808 A   8/2010
JP   7-154325 A    6/1995
(Continued)

OTHER PUBLICATIONS

Chinese Office Action for CN Application No. 201380040750.5 issued on May 25, 2016 with English Translation.
(Continued)

*Primary Examiner* — Tesfaldet Bocure

(57) ABSTRACT

At least two light-emitting elements emit light to a branching device, and the branching device divides the light that entered into an input port into at least two and emits the light from M number of output ports. An optical modulator individually modulates the M number of light beams that were emitted. When a first light-emitting element driven normally fails, the first light-emitting element is stopped and a second light-emitting element that was stopped is driven, thereby maintaining the emission of the modulated M number of light beams.

19 Claims, 21 Drawing Sheets

(51) Int. Cl.
  *H04B 10/032* (2013.01)
  *H04B 10/50* (2013.01)
  *H04B 10/079* (2013.01)
  *G02B 6/35* (2006.01)

(58) Field of Classification Search
  CPC ... H01L 2924/14; H01L 31/0232; F21K 9/00; G02B 6/2938; H04B 10/505; H04B 10/5053; G02F 2203/12
  USPC .................. 398/9, 12, 17, 140; 359/327, 325
  See application file for complete search history.

(56) References Cited

U.S. PATENT DOCUMENTS 6,429,955 B1 * 8/2002 Suemura ............ H04Q 11/0001
  398/48
7,877,018 B2 * 1/2011 Ann ................... H04B 10/1149
  398/172
2002/0191904 A1 12/2002 Kani et al.

FOREIGN PATENT DOCUMENTS

| | | |
|---|---|---|
| JP | 10-65649 A | 3/1998 |
| JP | 2002-374207 A | 12/2002 |
| JP | 2007-256716 A | 10/2007 |
| WO | 2007/004257 A | 1/2007 |

OTHER PUBLICATIONS

International Search Report for PCT Application No. PCT/JP2013/070465, mailed on Sep. 3, 2013.
English Translation of the Written Opinion of the International Search Authority for PCT Application No. PCT/JP2013/070465, mailed on Sep. 3, 2013.

* cited by examiner

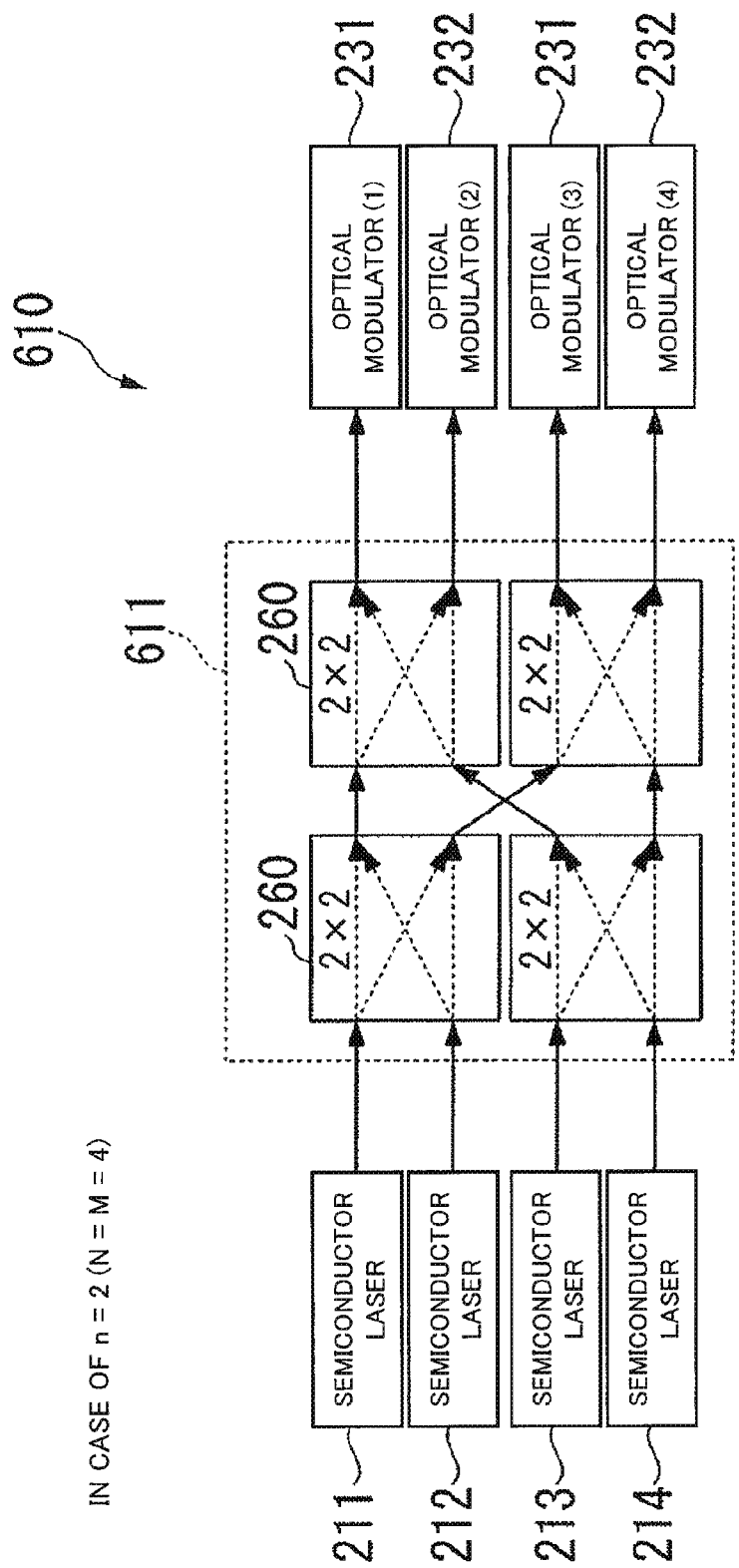

FIG.19
(a)
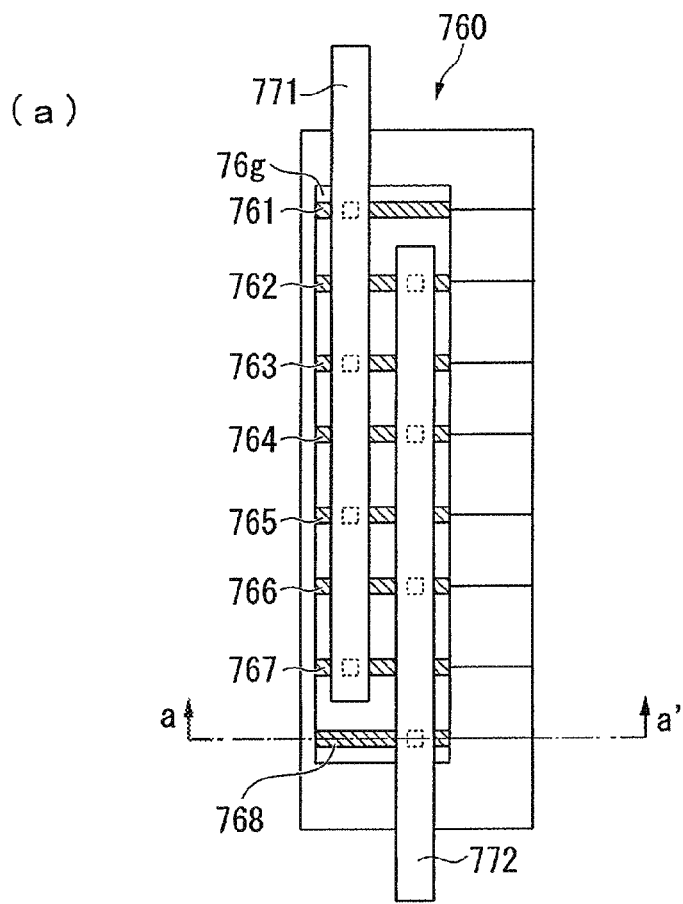
(b)
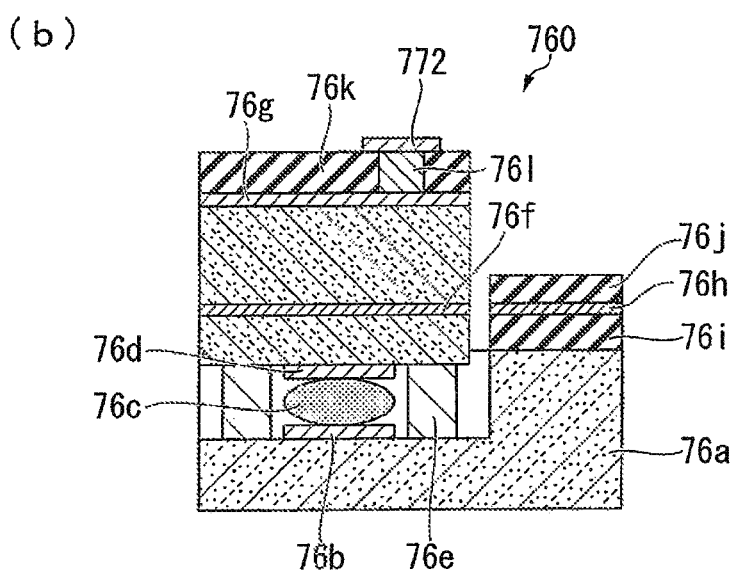

OPTICAL TRANSMITTER AND OPTICAL COMMUNICATION DEVICE

This application is a National Stage Entry of PCT/JP2013/070465 filed on Jul. 29, 2013, which claims priority from Japanese Patent Application 2012-168219 filed on Jul. 30, 2012, the contents of all of which are incorporated herein by reference, in their entirety.

TECHNICAL FIELD

The present invention relates to an optical transmitter that emits a plurality of optical modulation signals in parallel and to an optical communication device including the optical transmitter.

BACKGROUND ART

Currently, an optical communication device may be packaged in the interior of a so-called electronic instrument. Such an optical communication device includes, for example, an optical transmitter, M optical waveguides, and an optical receiver. The optical transmitter converts M electric signals, which are externally input, into M optical modulation signals and emits the optical modulation signals as light beams in parallel.

The M optical waveguides allow the M optical modulation signals emitted as the light beams in parallel to be transmitted in parallel. The optical receiver receives the M optical modulation signals, transmitted in parallel, through the M optical waveguides, to convert the M optical modulation signals into M electric signals.

An optical transmitter in such an optical communication device as described above simply includes M light-emitting elements, such as semiconductor lasers, and M optical modulators. In such an optical transmitter, M optical modulators individually modulate light beams individually emitted from M light-emitting elements.

However, current semiconductor lasers has insufficient reliability compared to usual electronic circuits and may become unusable at unexpected timing. In such a configuration as mentioned above, an overall optical transmitter becomes unusable even if one of M semiconductor lasers becomes unusable.

In order to solve the above, there has been proposed an optical transmitter in which one semiconductor laser is used, a light beam from the laser is optically distributed into M light beams in parallel through optical fibers and the like, and the M light beams are individually modulated by M optical modulators, to make optical modulation signals (for example, see Patent Literature 1).

CITATION LIST

Patent Literature

[PTL 1] Japanese Patent Laid-Open No. 2007-256716

SUMMARY OF INVENTION

Technical Problem

The number of the semiconductor laser of the optical transmitter of Patent Literature 1 is one which is one Mth that of an optical transmitter in which M light-emitting elements and M optical modulators are combined. Therefore, a probability that the overall optical transmitter becomes unusable because the one semiconductor laser becomes unusable is also one Mth.

However, the fact that the overall optical transmitter becomes unusable when the one semiconductor laser becomes unusable remains unchanged. Therefore, there has been a problem that high redundancy has been unable to be achieved.

The present invention is directed at providing: an optical transmitter that solves such a problem as mentioned above; and an optical communication device including the optical transmitter.

Solution to Problem

An optical transmitter according to one exemplary embodiment of the present invention includes: at least two light-emitting elements for emitting beams; a branching device including input ports on which beams emitted by the light-emitting elements are incident and output ports for branching beams, incident on the input ports, into at least two beams and for emitting the beams; and optical modulators for individually modulating beams emitted from the output ports.

An optical communication device according to one exemplary embodiment of the present invention includes: the optical transmitter of the present invention; M optical waveguides for transmitting beams, individually emitted from the M optical modulators of the optical transmitter, in parallel; and an optical receiver for receiving M beams in parallel from the M optical waveguides.

Advantageous Effects of Invention

The optical transmitter of the present invention can achieve high redundancy.

BRIEF DESCRIPTION OF DRAWINGS

FIG. 13B is a schematic block diagram illustrating the circuit structure of a second alternative example of the optical transmitter according to the second exemplary embodiment of the present invention.

FIG. 19 illustrates the circuit structure of a laser array which is the light-emitting element of the optical element device according to the sixth exemplary embodiment of the present invention, in which FIG. 19 (a) is a schematic plan view, and FIG. 19 (b) is a cross-sectional view taken along the line a-a' of FIG. 19 (a). FIG. 19 is a schematic circuit diagram illustrating the structure of an alternative example of the optical transmitter according to the exemplary embodiment of the present invention.

DESCRIPTION OF EMBODIMENTS

Figure 1:
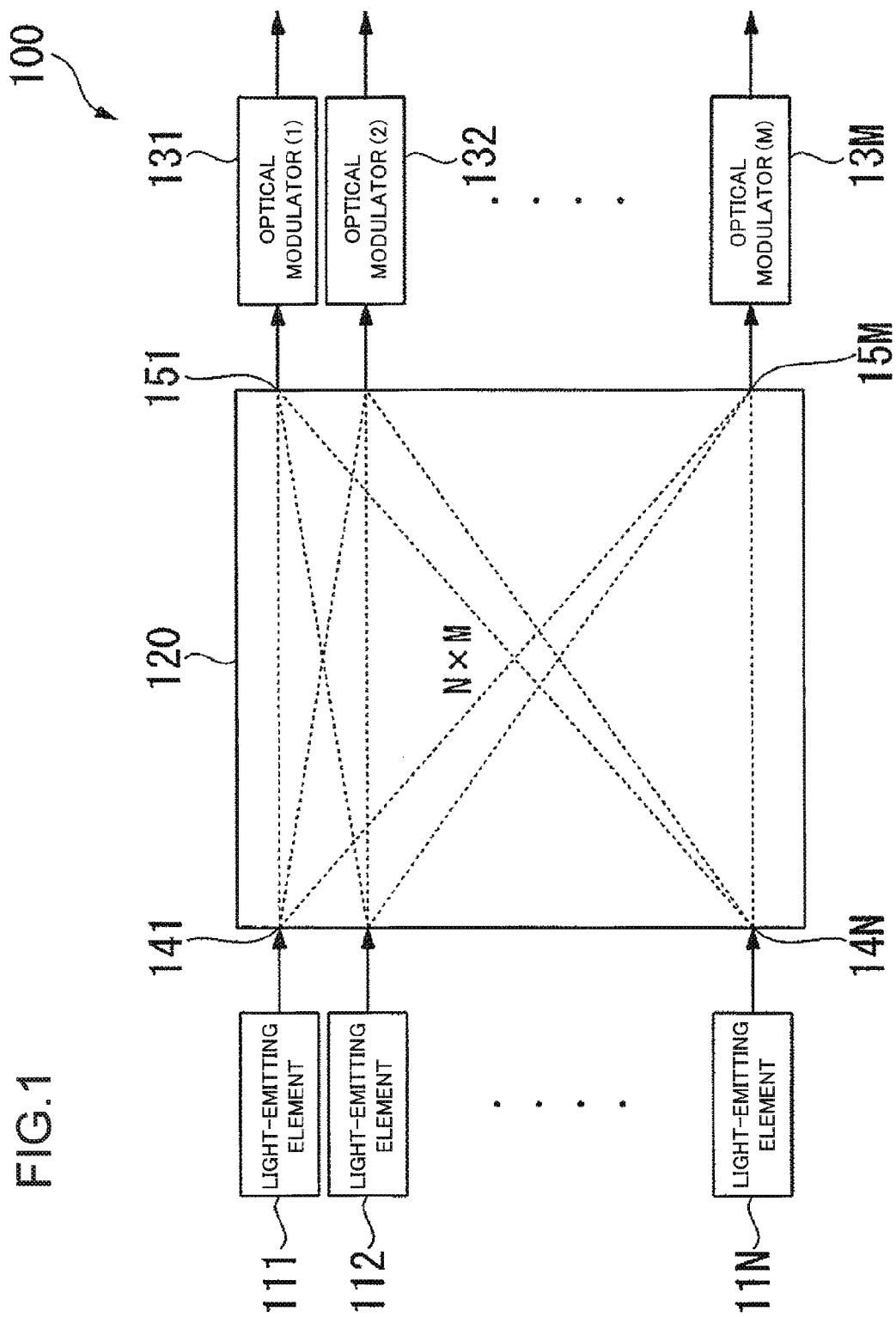
FIG. 1 is a schematic block diagram illustrating the circuit structure of an optical transmitter according to a first exemplary embodiment of the present invention.

The first exemplary embodiment of the present invention will be explained below with reference to FIG. 1. FIG. 1 is a schematic block diagram illustrating the circuit structure of the optical transmitter of the present exemplary embodiment.

The optical transmitter 100 of the present exemplary embodiment includes N (N is a natural number of 2 or more)

light-emitting elements 111 to 11N, an N×M branching device 120, and M (M is a natural number of 2 or more) optical modulators 131 to 13M.

The N light-emitting elements 111 to 11N include semiconductor lasers, high-brightness LEDs (Light Emitting Diodes), and the like, and each emits light beams. The N light-emitting elements 111 to 11N are individually connected to, for example, N driver circuits, and the N driver circuits are connected to one control circuit (not illustrated).

The N×M branching device 120 includes N input ports 141 to 14N and M output ports 151 to 15M. The N×M branching device 120 branches a light beam, incident from one of the N light-emitting elements 111 to 11N to one of the N input ports 141 to 14N, equally into M beams, to emit the beams in parallel from the M output ports 151 to 15M.

The M optical modulators 131 to 13M individually modulate light beams incident individually from the M output ports 151 to 15M.

In such a configuration as mentioned above, in the optical transmitter 100 of the present exemplary embodiment, for example, the control circuit selectively controls only one of the N driver circuits. Therefore, only one of the N light-emitting elements 111 to 11N connected to the one driver circuit is selectively normally driven, and the remaining light-emitting elements 111 to 11N other than the one are stopped as backups.

Thus, for example, one light beam emitted by the first light-emitting element 111 as one driven as mentioned above is allowed to be incident on the first input port 141 of the N×M branching device 120. The light beam incident on the first input port 141 is branched equally into M light beams, which are emitted in parallel from the M output ports 151 to 15M.

The M light beams emitted equally in parallel in such a manner are individually modulated by the M optical modulators 131 to 13M. Therefore, the optical transmitter 100 of the present exemplary embodiment can output optical modulation signals including the M light beams in parallel.

For example, when a malfunction occurs in the first light-emitting element 111 which is normally driven as mentioned above, the emission of the M modulated light beams can be maintained by stopping the light-emitting element 111 and by driving the stopped second light-emitting element 112.

Since the light-emitting elements 111 to 11N as mentioned above can be switched up to (N−1) times corresponding to the number of the light-emitting elements 111 to 11N, a probability that the optical transmitter 100 of the present exemplary embodiment becomes unusable can be further allowed to be one Mth that of the optical transmitter of Patent Literature 1.

Therefore, the optical transmitter 100 of the present exemplary embodiment can achieve high redundancy.

Figure 2:
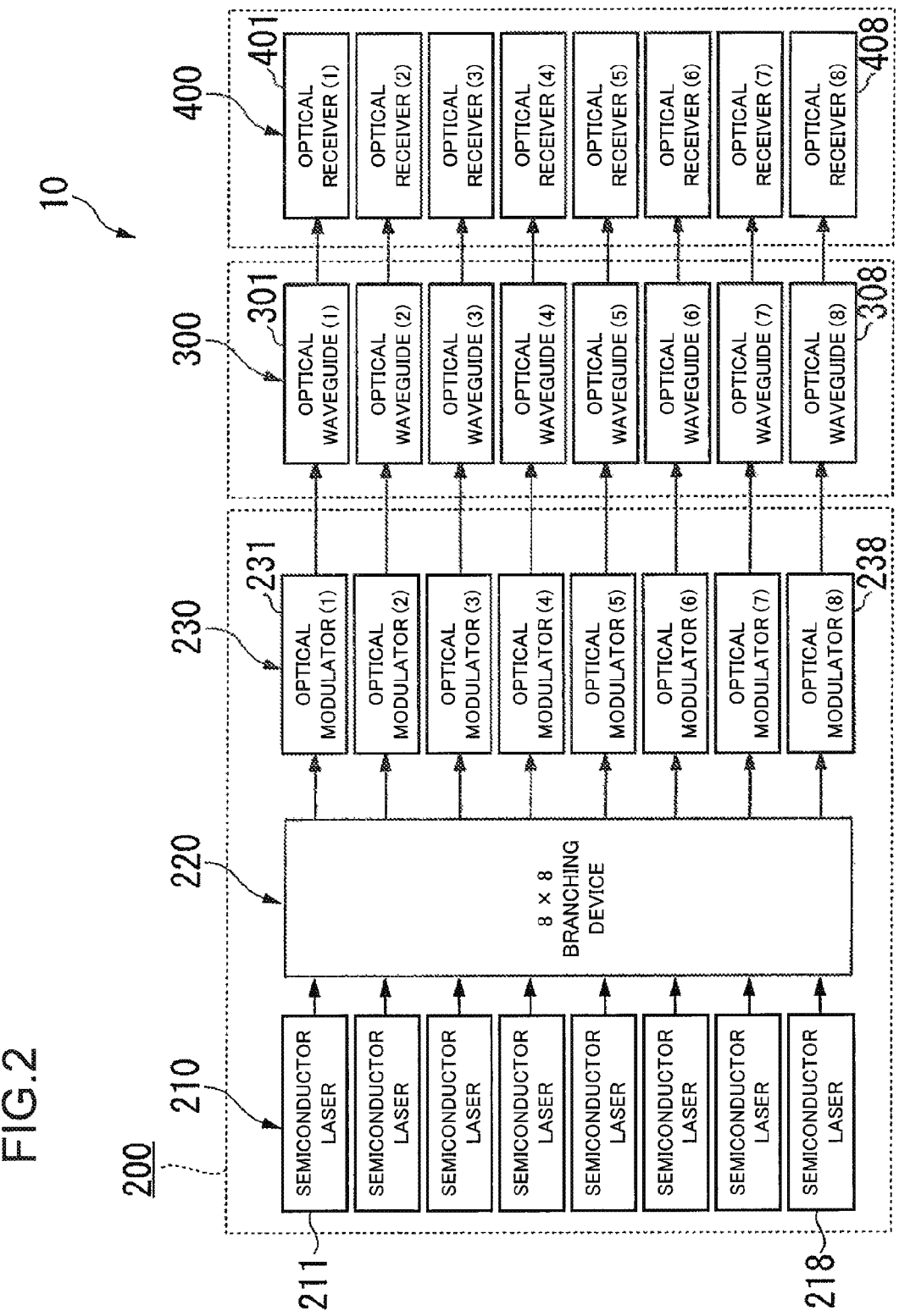
FIG. 2 is a schematic block diagram illustrating the circuit structure of an optical communication device according to a second exemplary embodiment of the present invention.
Figure 3:
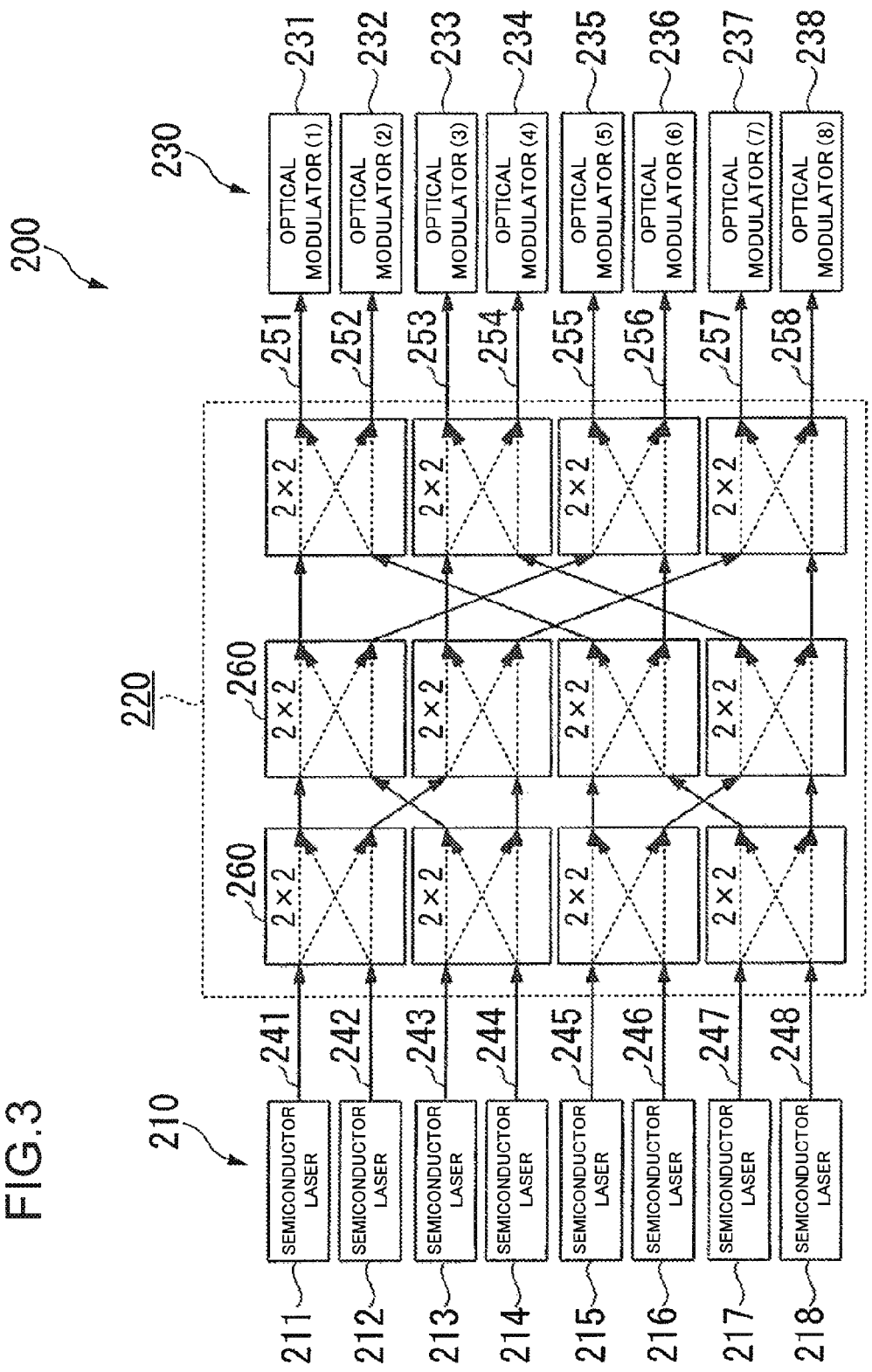
FIG. 3 is a schematic block diagram illustrating the circuit structure of the optical transmitter of the optical communication device according to the second exemplary embodiment of the present invention.
Figure 4:
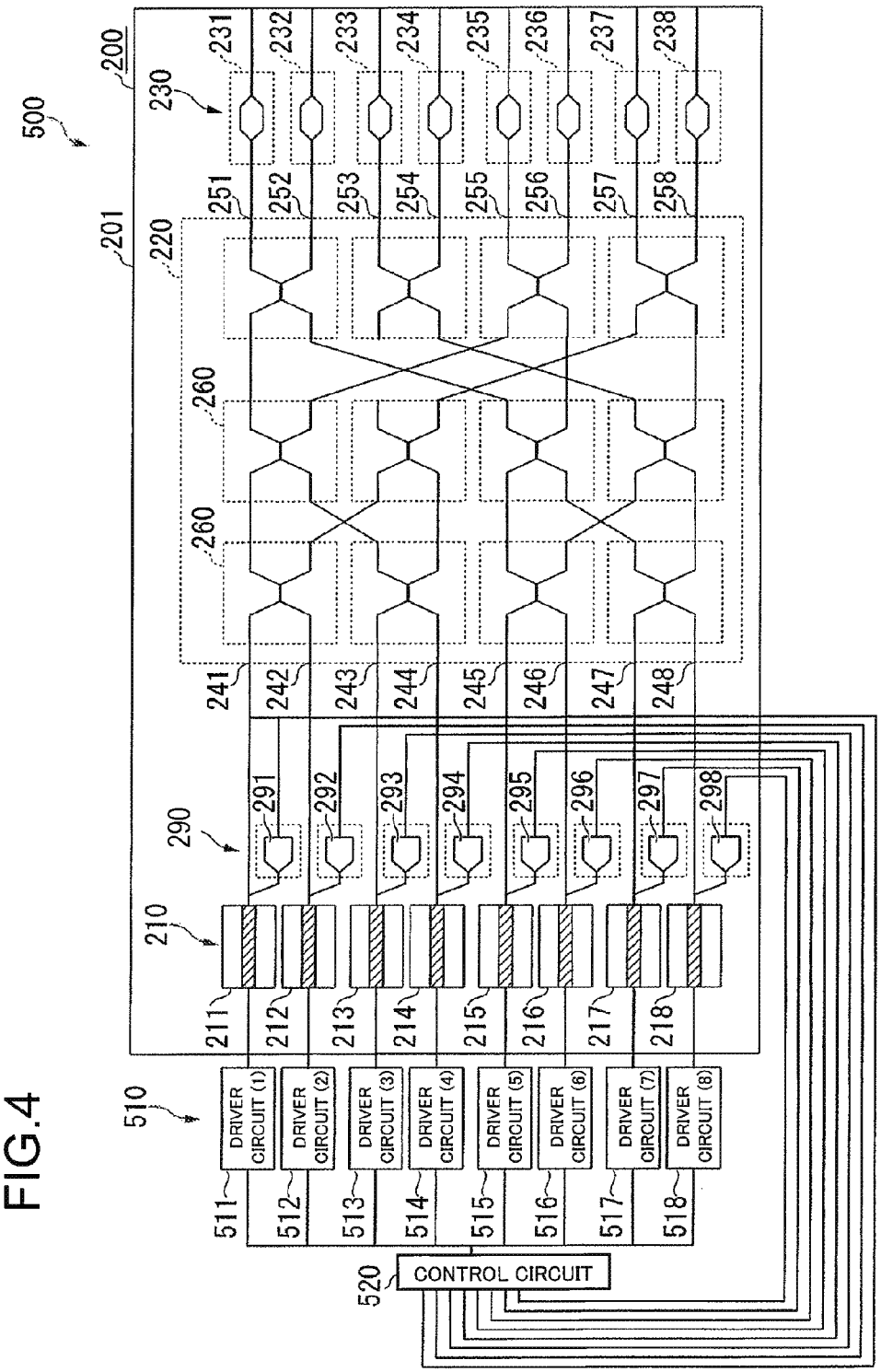
FIG. 4 is a schematic circuit diagram illustrating the structure of an optical element device which is the optical transmitter of the optical communication device according to the second exemplary embodiment of the present invention.

The second exemplary embodiment of the present invention will be explained below with reference to FIG. 2 to FIG. 12. FIG. 2 is a schematic block diagram illustrating the circuit structure of the optical communication device of the present exemplary embodiment, FIG. 3 is a schematic block diagram illustrating the circuit structure of the optical transmitter of the optical communication device, and FIG. 4 is a schematic circuit diagram illustrating the structure of an optical element device which is the optical transmitter.

Figure 5:
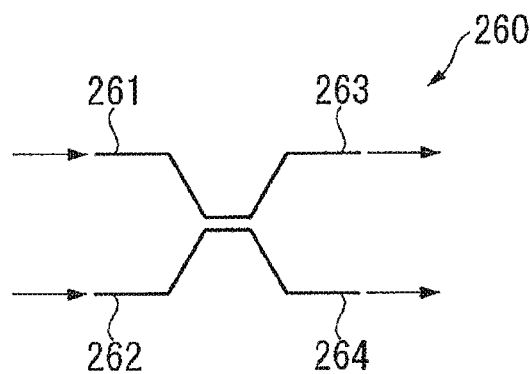
FIG. 5 is a schematic circuit diagram illustrating the structure of a directional coupler type 3 dB coupler which is a 2×2 branching device that forms the N×M branching device of the optical transmitter according to the second exemplary embodiment of the present invention.
Figure 6:
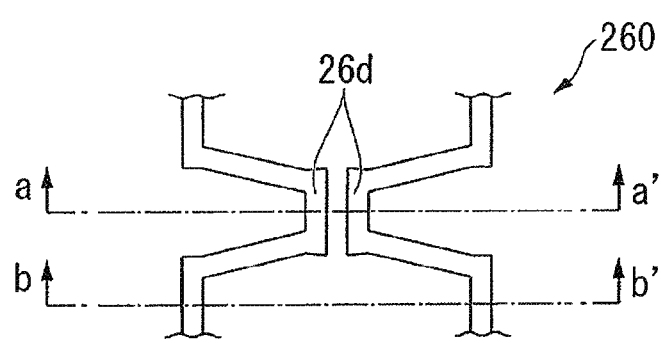
FIG. 6 is a schematic plan view illustrating the circuit structure of the directional coupler type 3 dB coupler of the optical transmitter according to the second exemplary embodiment of the present invention.
Figure 7:
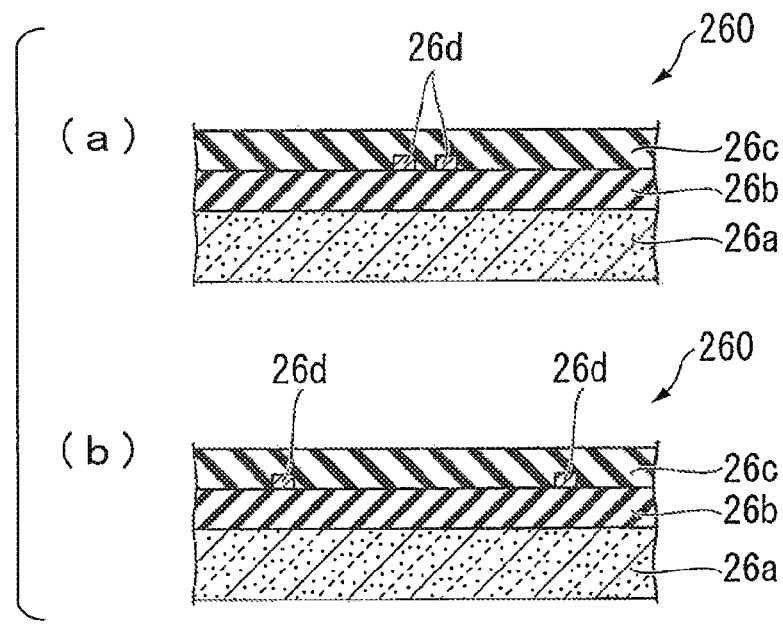
FIG. 7 illustrates the inner structure of the directional coupler type 3 dB coupler of the optical transmitter according to the second exemplary embodiment of the present invention, in which FIG. 7 (a) is a cross-sectional view taken along the line a-a' of FIG. 6, and FIG. 7 (b) is a cross-sectional view taken along the line b-b' of FIG. 6.

FIG. 5 is a schematic circuit diagram illustrating the structure of a directional coupler type 3 dB coupler which is a 2×2 branching device that forms the N×M branching device of the optical transmitter, FIG. 6 is a schematic plan view illustrating the circuit structure of the directional coupler type 3 dB coupler, and FIG. 7 illustrates the inner structure of the directional coupler type 3 dB coupler, in which FIG. 7 (a) is a cross-sectional view taken along the line a-a' of FIG. 6, and FIG. 7 (b) is a cross-sectional view of taken along the line b-b'.

Figure 8:
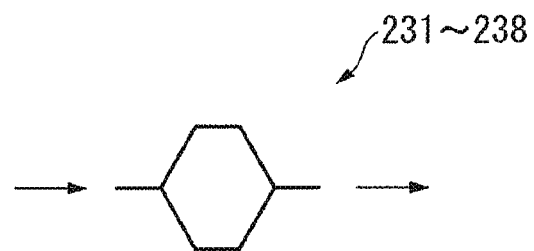
FIG. 8 is a schematic circuit diagram illustrating the structure of the MZI optical modulator of the optical transmitter according to the second exemplary embodiment of the present invention.
Figure 9:
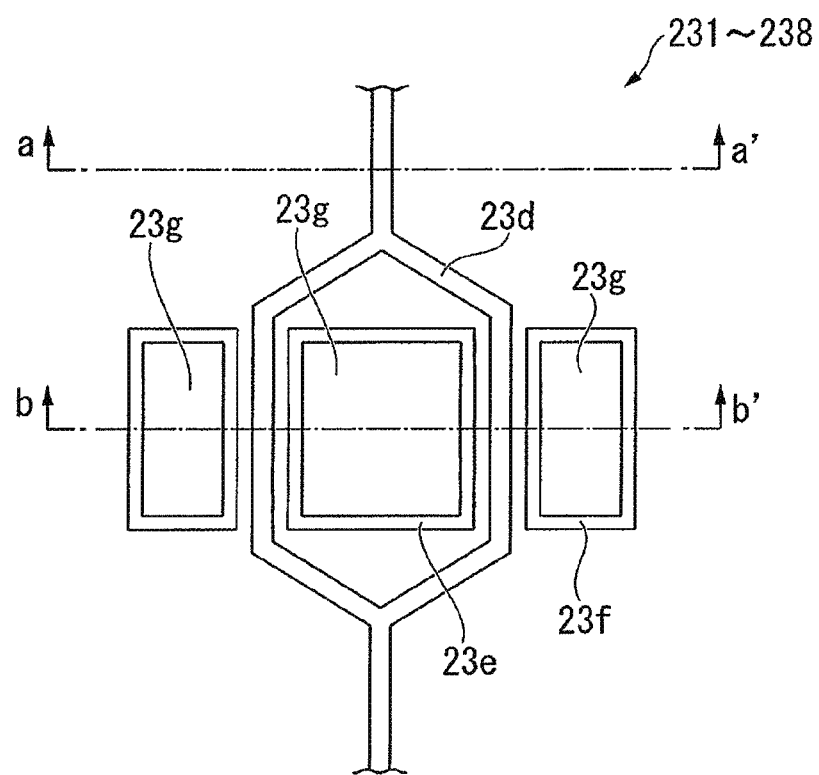
FIG. 9 is a schematic plan view illustrating the circuit structure of the MZI optical modulator of the optical transmitter according to the second exemplary embodiment of the present invention.
Figure 10:
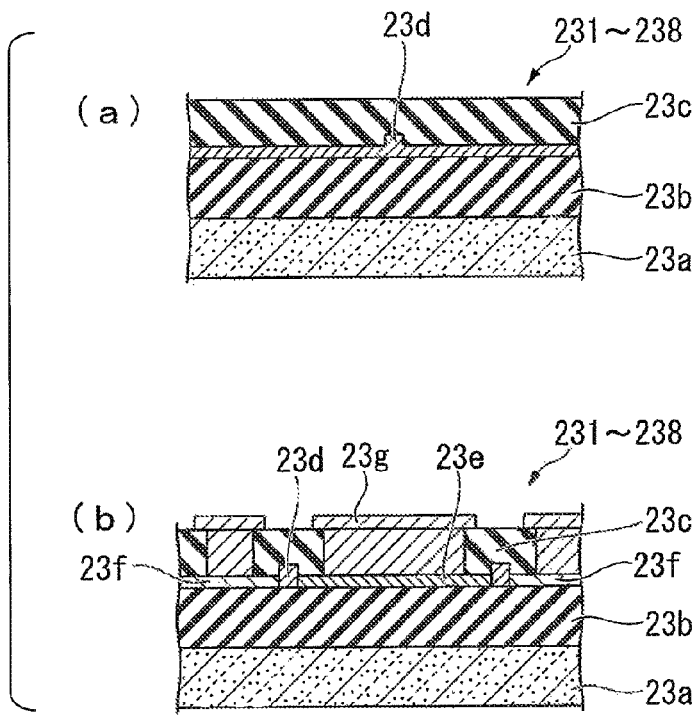
FIG. 10 illustrates the inner structure of the MZI optical modulator of the optical transmitter according to the second exemplary embodiment of the present invention, in which FIG. 10 (a) is a cross-sectional view taken along the line a-a' of FIG. 9, and FIG. 10 (b) is a cross-sectional view taken along the line b-b' of FIG. 9.

FIG. 8 is a schematic circuit diagram illustrating the structure of the MZI optical modulator of the optical transmitter, FIG. 9 is a schematic plan view illustrating the circuit structure of the MZI optical modulator, and FIG. 10 illustrates the inner structure of the MZI optical modulator, in which FIG. 10 (a) is a cross-sectional view taken along the line a-a' of FIG. 9, and FIG. 10 (b) is a cross-sectional view taken along the line b-b' of FIG. 9.

Figure 11:
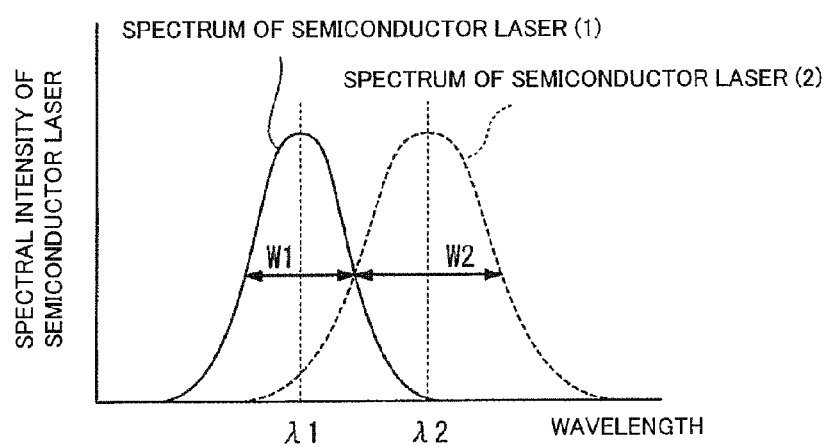
FIG. 11 is a characteristic diagram indicating the relationships between the wavelengths and spectral intensities of a first semiconductor laser and a second semiconductor laser which are the light-emitting elements of the optical transmitter according to the second exemplary embodiment of the present invention.
Figure 12:
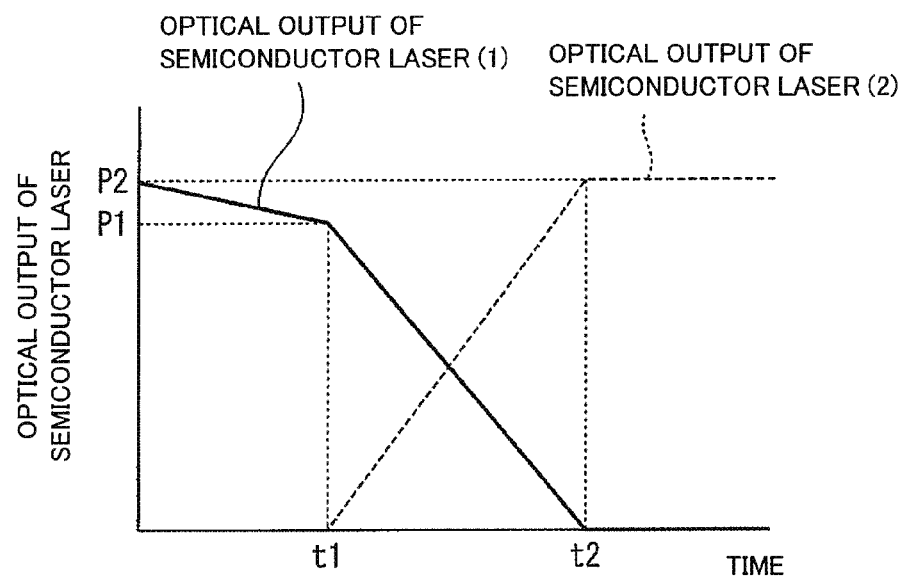
FIG. 12 is a characteristic diagram indicating the variations with time of the outputs of the first semiconductor laser and the second semiconductor laser in the optical transmitter according to the second exemplary embodiment of the present invention.

FIG. 11 is a characteristic diagram indicating the relationships between the wavelengths and spectral intensities of a first semiconductor laser and a second semiconductor laser which are the light-emitting elements of the optical transmitter, and FIG. 12 is a characteristic diagram indicating the variations with time of the outputs of the first semiconductor laser and the second semiconductor laser.

The optical communication device 10 of the second exemplary embodiment of the present invention includes an optical transmission device 500, which is also an optical transmitter, an optical waveguide array 300, and an optical receiver array 400, as illustrated in FIG. 2, and the optical transmission device 500 includes an optical transmitter 200 as illustrated in FIG. 4.

The optical transmitter 200 of the second exemplary embodiment of the present invention includes a laser array 210, an 8×8 branching device 220, which is an N×M branching device, and a modulator array 230, as illustrated in FIG. 2 to FIG. 4.

In the optical transmitter 200 of the second exemplary embodiment of the present invention, the laser array 210 includes semiconductor lasers 211 to 218 which are light-emitting elements of N=8, and the eight semiconductor lasers 211 to 218 individually emit laser beams as light beams.

The 8×8 branching device 220 is formed of twelve directional coupler type 3 dB couplers 260 as illustrated in FIG. 4 and FIG. 7, and the twelve 3 dB couplers 260 are connected in a 4 by 3 matrix as illustrated in FIG. 3 and FIG. 4.

The 3 dB couplers 260 equally branch a light beam incident on one of two input ports 261 and 262 and emit such light beams from two output ports 263 and 264, as illustrated in FIG. 5.

Such an optical coupler 260 includes, for example, a $SiO_2$ lower cladding layer 26b and a $SiO_2$ upper cladding layer 26c which are layered in turn on a Si (silicon) substrate 26a; and Si optical waveguides 26d which are formed on the $SiO_2$ lower cladding layer 26b and sealed with the $SiO_2$ upper cladding layer 26c, as illustrated in FIG. 6 and FIG. 7.

The 8×8 branching device 220 includes input ports 241 to 248 of N=8 and output ports 251 to 258 of M=8 since such 3 dB couplers 260 as mentioned above are connected in a 4 by 3 matrix, as illustrated in FIG. 3 and FIG. 4.

Therefore, the 8×8 branching device 220 branches light beams, individually incident from the eight semiconductor lasers 211 to 218 to the eight input ports 241 to 248, equally into eight light beams and emits the light beams in parallel from the eight output ports 251 to 258.

The modulator array 230 includes MZI (Mach-Zehnder interferometer) type optical modulators 231 to 238 of M=8. The eight optical modulators 231 to 238 individually modulate light beams individually incident from the eight output ports 251 to 258 of the 8×8 branching device 220.

Each of such optical modulators 231 to 238 includes, for example, a Si substrate 23a, a $SiO_2$ lower cladding layer 23b, a $SiO_2$ upper cladding layer 23c, a Si optical waveguide 23d, p+−Si 23e, n+−Si 23f, and an electrode 23g, as illustrated in FIG. 4 and FIG. 8 to FIG. 10.

In general, an N×M branching device can be realized in a structure, in which 3 dB couplers 260 of which the number is $2^n-1 \times n$ are connected in a matrix, or a portion thereof, in the case of N≤M and $M=2^n$ (n is a natural number). The optical transmission device 500 which is an optical transmitter partially including the optical transmitter 200 of the present exemplary embodiment will be explained in more detail below.

The optical transmission device 500 of the second exemplary embodiment of the present invention includes a detector array 290 which is a monitoring unit, and the detector array 290 includes germanium photoreceivers 291 to 298 which are eight photodetectors, as illustrated in FIG. 4.

The eight germanium photoreceivers 291 to 298 are individually optically connected to eight optical waveguides through which the eight semiconductor lasers 211 to 218 and the input ports 241 to 248 of the 8×8 branching device 220 are optically connected to each other.

The eight germanium photoreceivers 291 to 298 individually detect light beams emitted from the semiconductor lasers 211 to 218 to the eight input ports 241 to 248 of the 8×8 branching device 220.

The optical transmission device 500 of the second exemplary embodiment includes a driver array 510 which is a driving unit, and the driver array 510 selectively drives the eight semiconductor lasers 211 to 218.

The driver array 510 includes eight driver circuits 511 to 518, and the eight driver circuits 511 to 518 are individually connected to the eight semiconductor lasers 211 to 218, respectively. The driver circuits 511 to 518 are connected to one control circuit 520, and the eight germanium photoreceivers 291 to 298 are connected to the one control circuit 520.

The one control circuit 520 selectively drives one of the driver circuits 511 to 518 in response to the detection results of the eight germanium photoreceivers 291 to 298, whereby one of the eight semiconductor lasers 211 to 218 selectively emits a light beam.

In the semiconductor lasers 211 to 218 of the optical transmission device 500 of the second exemplary embodiment, it is assumed that, for example, the center wavelength of the ath semiconductor laser 21a which is normally driven is $\lambda 1$, the full-width at half maximum of the wavelength spectrum of the ath semiconductor laser 21a is w1, the center wavelength of the (a+1)th semiconductor laser 21(a+1) which is normally stopped is $\lambda 2$, and the full-width at half maximum of the wavelength spectrum of the (a+1)th semiconductor laser 21(a+1) is w2, as indicated in FIG. 11.

In addition, the ath semiconductor laser 21a and the (a+1)th semiconductor laser 21(a+1) satisfy $|\lambda 1-\lambda 2| \geq (w1+w2)/2$.

In the optical transmission device 500 of the second exemplary embodiment, it is specified that the lower limit of the output of a light beam from the ath semiconductor laser 21a which is normally driven is P1 and the normal output thereof is P2, as indicated in FIG. 12.

In addition, the control circuit 520 decreases the output of the ath semiconductor laser 21a which is normally driven to zero (0) with time and increases the output of the (a+1)th semiconductor laser 21(a+1) as a backup, which is stopped, from zero (0) to P2 with time when it is detected that the output of a light beam from the ath semiconductor laser 21a which is normally driven decreases from P2 to P1.

As illustrated in FIG. 2, eight optical waveguides 301 to 308 in the optical waveguide array 300 are optically connected to the optical transmission device 500 as mentioned above, and the eight optical waveguides 301 to 308 are optically connected to eight optical receivers 401 to 408 in the optical receiver array 400.

In the optical transmitter 200 of the second exemplary embodiment, the eight semiconductor lasers 211 to 218, the twelve 3 dB couplers 260, the eight optical modulators 231 to 238, and the eight germanium photoreceivers 291 to 298 as mentioned above are integrated on a silicon substrate 201 which is one semiconductor substrate. The eight semiconductor lasers 211 to 218 are individually separated and placed as illustrated in FIG. 4.

In the optical transmission device 500 of the second exemplary embodiment, the eight driver circuits 511 to 518 and the one control circuit 520 may also be integrated on the silicon substrate 201 which is one semiconductor substrate in the optical transmitter 200 or may also be formed on a silicon substrate (not illustrated) which is another semiconductor substrate.

In such a configuration as mentioned above, the optical transmitter 200 of the second exemplary embodiment of the present invention functions in a manner similar to that of the optical transmitter 100 mentioned above as the first embodiment. In the optical transmission device 500 which is an optical transmitter partially including the optical transmitter 200, the control circuit 520 normally drives the first driver circuit 511 which is one of the eight driver circuits 511 to 518 and normally stops the remaining seven backup driver circuits 512 to 518.

Therefore, one light beam emitted by one of the first semiconductor laser 211 which is normally driven in the first driver circuit 511 is branched into eight light beams in parallel by the 8×8 branching device 220, and the light beams are individually modulated by the eight optical modulators 231 to 238. The eight optical modulation signals emitted in parallel from the optical transmission device 500 are transmitted in parallel through the eight optical waveguides 301 and individually received by the eight optical receivers 401 to 408.

In this case, a light beam emitted from the first semiconductor laser 211 to the first input port 241 of the 8×8 branching device 220 is detected by the first germanium photoreceiver 291, and the detection results of the first germanium photoreceiver 291 are always monitored by the control circuit 520.

As mentioned above, it is specified that the lower limit of the output of a light beam from the ath semiconductor laser 21a which is normally driven is P1 and the normal output thereof is P2, as indicated in FIG. 12, in the optical transmission device 500 of the second exemplary embodiment.

The control circuit 520 decreases the output of the first semiconductor laser 211 which is normally driven to zero (0) with time and increases the output of the second semiconductor laser 212 as a backup, which is stopped, from zero (0) to P2 with time when the output of the first semiconductor laser 211 is detected decreasing from P2 to P1 by the first germanium photoreceiver 291 as mentioned above.

In this case, the center wavelength of the first semiconductor laser 211 which is normally driven is $\lambda 1$, the full-width at half maximum of the wavelength spectrum thereof is w1, the center wavelength of the second semiconductor laser 212 which is normally stopped is λ2, and the full-width at half maximum of the wavelength spectrum thereof is w2, as indicated in FIG. 11, $$|\lambda 1-\lambda 2|\geq (w1+w2)/2$$

is satisfied, and therefore, a problem such as interference does not occur when the semiconductor lasers 211 and 212 are switched with time as mentioned above.

When the second semiconductor laser 212 is in the state of being normally driven as mentioned above, the output thereof is always detected by the second germanium photoreceiver 292 and monitored by the control circuit 520, and the third semiconductor laser 213 is used as a backup.

Since the eight semiconductor lasers 211 to 218 as mentioned above can be switched up to seven times corresponding to the number of the semiconductor lasers 211 to 218, a probability that the optical transmission device 500 of the second exemplary embodiment becomes unusable can be further allowed to be one eighth that of the optical transmitter of Patent Literature 1. Therefore, the optical transmitter 200 of the present exemplary embodiment can achieve high redundancy.

In the optical transmitter 200 of the second exemplary embodiment, the eight semiconductor lasers 211 to 218, the twelve 3 dB couplers 260, the eight optical modulators 231 to 238, and the eight germanium photoreceivers 291 to 298 are integrated on the silicon substrate 201 which is one semiconductor substrate.

Therefore, the eight semiconductor lasers 211 to 218, the twelve 3 dB couplers 260, the eight optical modulators 231 to 238, and the eight germanium photoreceivers 291 to 298 can be reliably optically connected, and the productivity and packaging density thereof can be improved.

Further, the eight semiconductor lasers 211 to 218 are individually separated and placed in the optical transmitter 200 of the second exemplary embodiment. Therefore, crosstalk or the like does not occur in the eight semiconductor lasers 211 to 218.

In the optical transmitter 200 of the second exemplary embodiment, light beams emitted from the semiconductor lasers 211 to 218 to the eight input ports 241 to 248 of the 8×8 branching device 220 are individually detected by the eight germanium photoreceivers 291 to 298.

Therefore, light beams emitted from the semiconductor lasers 211 to 218 to the eight input ports 241 to 248 of the 8×8 branching device 220 can be individually directly detected by the eight germanium photoreceivers 291 to 298.

The present invention is not limited to the second exemplary embodiment, but various modifications may be made without departing from the spirit and scope of the present invention. For example, it was exemplified in the above embodiment that the 8×8 branching device 220 which is the N×M branching device of the optical transmitter 200 of the optical transmission device 500 includes the 2×2 3 dB couplers 260 connected in a 4 by 3 matrix, and the eight semiconductor lasers 211 to 218 and the eight optical modulators 231 to 238 are optically connected to each other through the one 8×8 branching device 220 including the twelve 3 dB couplers 260.

Figure 13A:
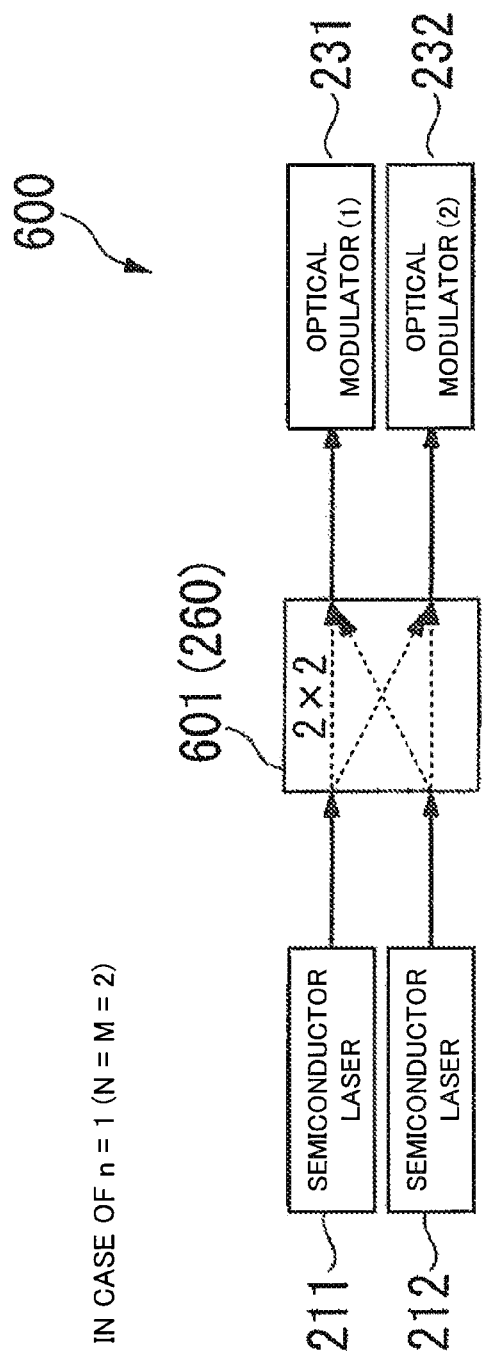
FIG. 13A is a schematic block diagram illustrating the circuit structure of a first alternative example of the optical transmitter according to the second exemplary embodiment of the present invention.

However, two semiconductor lasers 211 and 212 and two optical modulators 231 and 232 may be optically connected through one optical modulator 601 including one 3 dB coupler 260 as in the case of an optical transmitter 600 exemplified in FIG. 13A.

Four semiconductor lasers 211 to 214 and four optical modulators 231 to 234 may be optically connected through one 4×4 optical modulator 611 including four 3 dB couplers 260 as in the case of an optical transmitter 610 exemplified in FIG. 13B.

Figure 14:
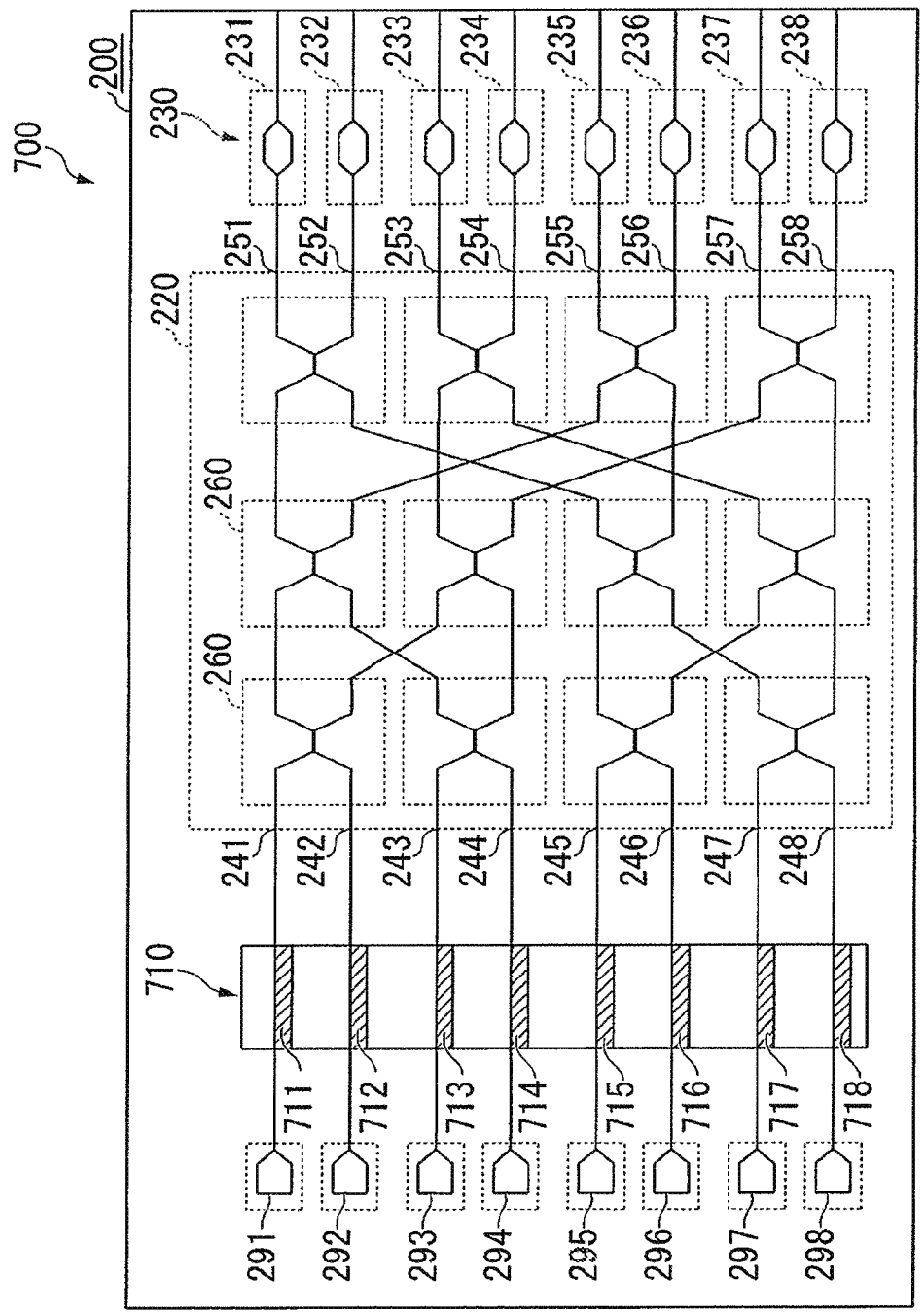
FIG. 14 is a schematic circuit diagram illustrating the structure of an optical transmitter according to a third exemplary embodiment of the present invention.

Next, an optical communication device which is an optical transmitter of the third exemplary embodiment of the present invention will be explained below with reference to FIG. 14. FIG. 14 is a schematic circuit diagram illustrating the structure of the optical transmitter of the present exemplary embodiment.

In the optical transmitter 700 of the third exemplary embodiment of the present invention, semiconductor lasers 711 to 718 in a laser array 710 include leakage ports, through which leakage beams leak, in sides opposite to ports for emission of a light beam to an 8×8 branching device 220.

Thus, eight germanium photoreceivers 291 to 298 in a detector array 290 are individually connected to the leakage ports of the eight semiconductor lasers 711 to 718, and the outputs of light beams are detected based on the outputs of leakage beams that individually leak from the leakage ports of the eight semiconductor lasers 711 to 718.

Even in the optical transmitter 700 of the third exemplary embodiment, the eight semiconductor lasers 711 to 718, twelve 3 dB couplers 260, eight optical modulators 231 to 238, and the eight germanium photoreceivers 291 to 298 as mentioned above are integrated on a silicon substrate 201 which is one semiconductor substrate.

Unlike the optical transmitter 200 mentioned above, the eight germanium photoreceivers 291 to 298 in the detector arrays 290 detect the outputs of light beams based on the outputs of leakage beams that individually leak from the leakage ports of the eight semiconductor lasers 711 to 718, in the optical transmitter 700 of the third exemplary embodiment in such a configuration as mentioned above.

Therefore, it is not necessary to branch light beams transmitted from the semiconductor lasers 711 to 718 to an 8×8 branching device 220 and to allow the light beams to be detected by the germanium photoreceivers 291 to 298, and the outputs of light beams transmitted from the semiconductor lasers 711 to 718 to the 8×8 branching device 220 can be prevented from decreasing.

Further, it is not necessary to form the eight germanium photoreceivers 291 to 298 in gaps between optical waveguides through which the eight semiconductor lasers 711 to 718 and eight input ports 241-248 in the 8×8 branching device 220 are optically connected to each other. Therefore, the spacings between the eight semiconductor lasers 711 to 718 can be minimized to improve a packaging density.

In particular, the eight semiconductor lasers 711 to 718 are integrally formed in the optical transmitter 700 of the third exemplary embodiment. Therefore, the packaging density of the eight semiconductor lasers 711 to 718 can be easily improved, and the productivity thereof can be improved.

Figure 15:
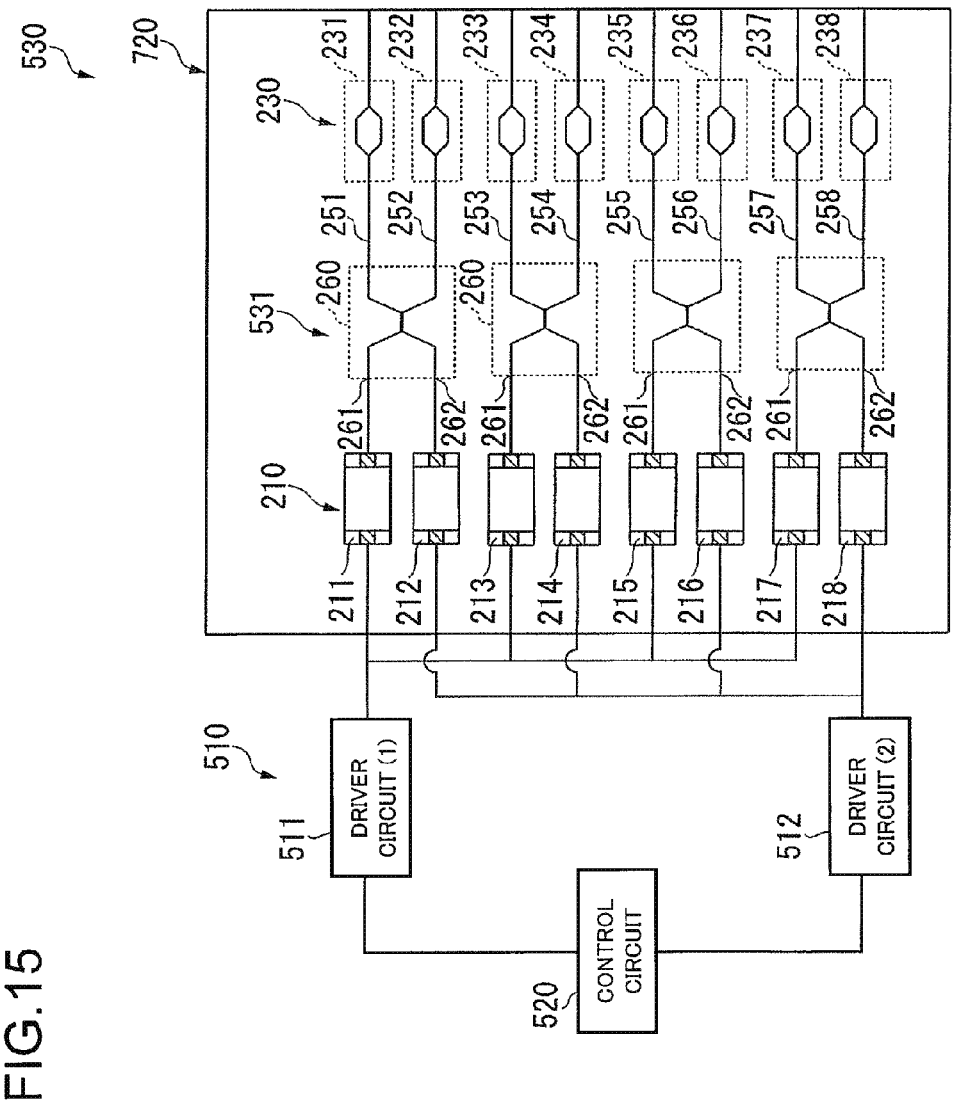
FIG. 15 is a schematic circuit diagram illustrating the structure of an optical element device which is an optical transmitter according to a fourth exemplary embodiment of the present invention.

Next, an optical transmitter of the fourth exemplary embodiment of the present invention will be explained below with reference to FIG. 15. FIG. 15 is a schematic circuit diagram illustrating the structure of an optical transmission device which is the optical transmitter of the present exemplary embodiment.

The optical transmission device 530 which is the optical transmitter of the fourth exemplary embodiment includes an optical transmitter 720, as illustrated. A laser array 210 in the optical transmitter 720 of the present exemplary embodiment includes semiconductor lasers 211 to 218 which are light-emitting elements of N=8, and a modulator array 230 includes MZI type optical modulators 231 to 238 of M=8.

However, the eight semiconductor lasers 211 to 218 are divided into two groups of four odd-numbered semiconductor lasers and four even-numbered semiconductor lasers. Therefore, an N×M branching device 531 is formed of four one-stage 3 dB couplers 260.

The four semiconductor lasers 211, 213, 215, and 217 of the first group are individually connected to the first input ports 261 of the first to fourth 3 dB couplers 260, respectively, and the semiconductor lasers 212, 214, 216, and 218 of the second group are individually connected to the second input ports 262 of the first to fourth 3 dB couplers 260, respectively.

In addition, two driver circuits 511 and 512 in a driver array 510 which is a driving unit are individually connected to the two groups of the odd-numbered four semiconductor lasers and the even-numbered four semiconductor lasers of the eight semiconductor lasers 211 to 218, respectively.

In the semiconductor lasers 211 to 218 of the optical transmission device 530 of the fourth exemplary embodiment, it is assumed that, for example, the center wavelengths of the semiconductor lasers 211, 213, 215, and 217 of the first group, which are normally driven, are $\lambda 1$, the full-widths at half maximum of the wavelength spectra of the semiconductor lasers 211, 213, 215, and 217 of the first group are w1, the center wavelengths of the semiconductor lasers 212, 214, 216, and 218 of the second group, which are normally stopped, are $\lambda 2$, and the full-widths at half maximum of the wavelength spectra of the semiconductor lasers 212, 214, 216, and 218 of the second group are w2, as indicated in FIG. 11.

In addition, $$|\lambda 1 - \lambda 2| \geq (w1 + w2)/2$$

is satisfied by the semiconductor lasers 211, 213, 215, and 217 of the first group and the semiconductor lasers 212, 214, 216, and 218 of the second group.

In the optical transmission device 530 of the fourth exemplary embodiment, it is specified that the lower limit of the output of a light beam from the semiconductor laser 21*a* of the first group, which is normally driven, is P1 and the normal output thereof is P2, as indicated in FIG. 12.

When the output of a light beam from the semiconductor laser 21*a* of the first group, which is normally driven, is detected decreasing from P2 to P1, a control circuit 520 decreases the output of the semiconductor laser 21*a* of the first group, which is normally driven, to zero (0) with time and increases the outputs of the semiconductor lasers 212, 214, 216, and 218 of the second group, as backups, which have been stopped, from zero (0) to P2 with time.

In such a configuration as mentioned above, the optical transmitter 720 of the fourth exemplary embodiment functions in a manner similar to that of the optical transmitter 200 mentioned above as the second embodiment. In the optical transmission device 530 which is an optical transmitter partially including the optical transmitter 720, the control circuit 520 normally drives the first driver circuit 511 which is one of the two driver circuits 511 and 512 and normally stops the remaining one backup second driver circuit 512.

Therefore, four light beams emitted in parallel by the semiconductor lasers 211, 213, 215, and 217 of the first group, which are normally driven in the first driver circuit 511, are branched into eight light beams in parallel by the N×M branching device 531, and the light beams are individually modulated by the eight optical modulators 231 to 238.

Even in the optical transmission device 530 of the fourth exemplary embodiment, the control circuit 520 decreases the outputs of the semiconductor lasers 211, 213, 215, and 217 of the first group, which are normally driven, to zero (0) with time and increases the outputs of the semiconductor lasers 212, 214, 216, and 218 of the second group, as backups, which have been stopped, from zero (0) to P2 with time when the output of any of the semiconductor lasers 211, 213, 215, and 217 of the first group is detected decreasing from P2 to P1, as indicated in FIG. 12.

In this case, the center wavelengths of the semiconductor lasers 211, 213, 215, and 217 of the first group, which are normally driven, are $\lambda 1$, the full-widths at half maximum of the wavelength spectra of the semiconductor lasers 211, 213, 215, and 217 of the first group are w1, the center wavelengths of the semiconductor lasers 212, 214, 216, and 218 of the second group, which are normally stopped, are $\lambda 2$, the full-widths at half maximum of the wavelength spectra of the semiconductor lasers 212, 214, 216, and 218 of the second group are w2, as indicated in FIG. 11, $$|\lambda 1 - \lambda 2| \geq (w1 + w2)/2$$

is satisfied, and therefore, a problem such as interference does not occur when the semiconductor lasers 211, 213, 215, and 217 of the first group and the semiconductor lasers 212, 214, 216, and 218 of the second group are switched with time as mentioned above.

Therefore, in the optical transmission device 530 of the fourth exemplary embodiment, the semiconductor lasers 211, 213, 215, and 217 of the first group and the semiconductor lasers 212, 214, 216, and 218 of the second group, as mentioned above, can be switched up to twice corresponding to the number of the groups.

Thus, a probability that the optical transmission device 530 and the optical transmitter 720 of the fourth exemplary embodiment become unusable can be further allowed to be one half that of the optical transmitter of Patent Literature 1, and the optical transmission device 530 and the optical transmitter 720 of the fourth exemplary embodiment can achieve high redundancy.

In the optical transmission device 530 of the present exemplary embodiment, eight optical modulation signals are output as mentioned above, and the driver circuits 511 and 512 for driving the eight semiconductor lasers 211 to 218 may be two. Therefore, the productivity and packaging density thereof can be improved.

Figure 16:
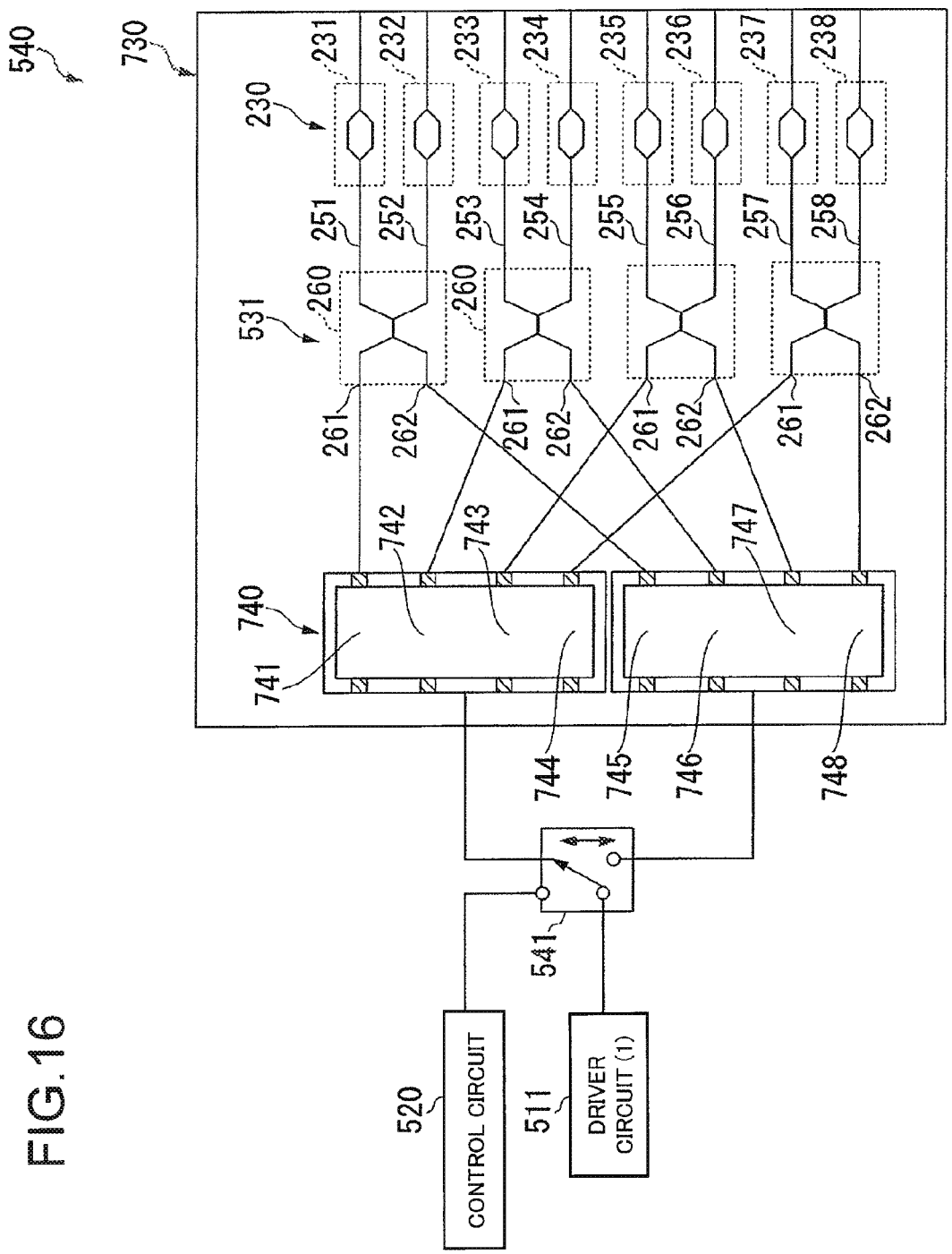
FIG. 16 is a schematic circuit diagram illustrating the structure of an optical element device which is an optical transmitter according to a fifth exemplary embodiment of the present invention.

Next, an optical element device which is an optical transmitter of the fifth exemplary embodiment of the present invention will be explained below with reference to FIG. 16 and FIG. 17. FIG. 16 is a schematic circuit diagram illustrating the structure of the optical element device which is the optical transmitter of the present exemplary embodiment, and FIG. 17 illustrates the circuit structure of a laser array which is a light-emitting element in the optical element device of the present exemplary embodiment, in which FIG. 17 (*a*) is a schematic plan view and FIG. 17 (*b*) is a cross-sectional view taken along the line a-a' of FIG. 17 (*a*).

The optical transmission device 540 which is the optical transmitter of the fifth exemplary embodiment includes an optical transmitter 730 as illustrated. A laser array 740 in the optical transmitter 730 of the present exemplary embodiment includes semiconductor lasers 741 to 748 which are light-emitting elements of N=8.

However, the eight semiconductor lasers 741 to 748 are divided into two groups of the first to fourth semiconductor lasers which are four and the fifth to eighth semiconductor lasers which are four. Therefore, based on the two groups, the first to fourth semiconductor lasers 741 to 744 are integrally formed, and the fifth to eighth semiconductor lasers 745 to 748 are also integrally formed.

Figure 17:
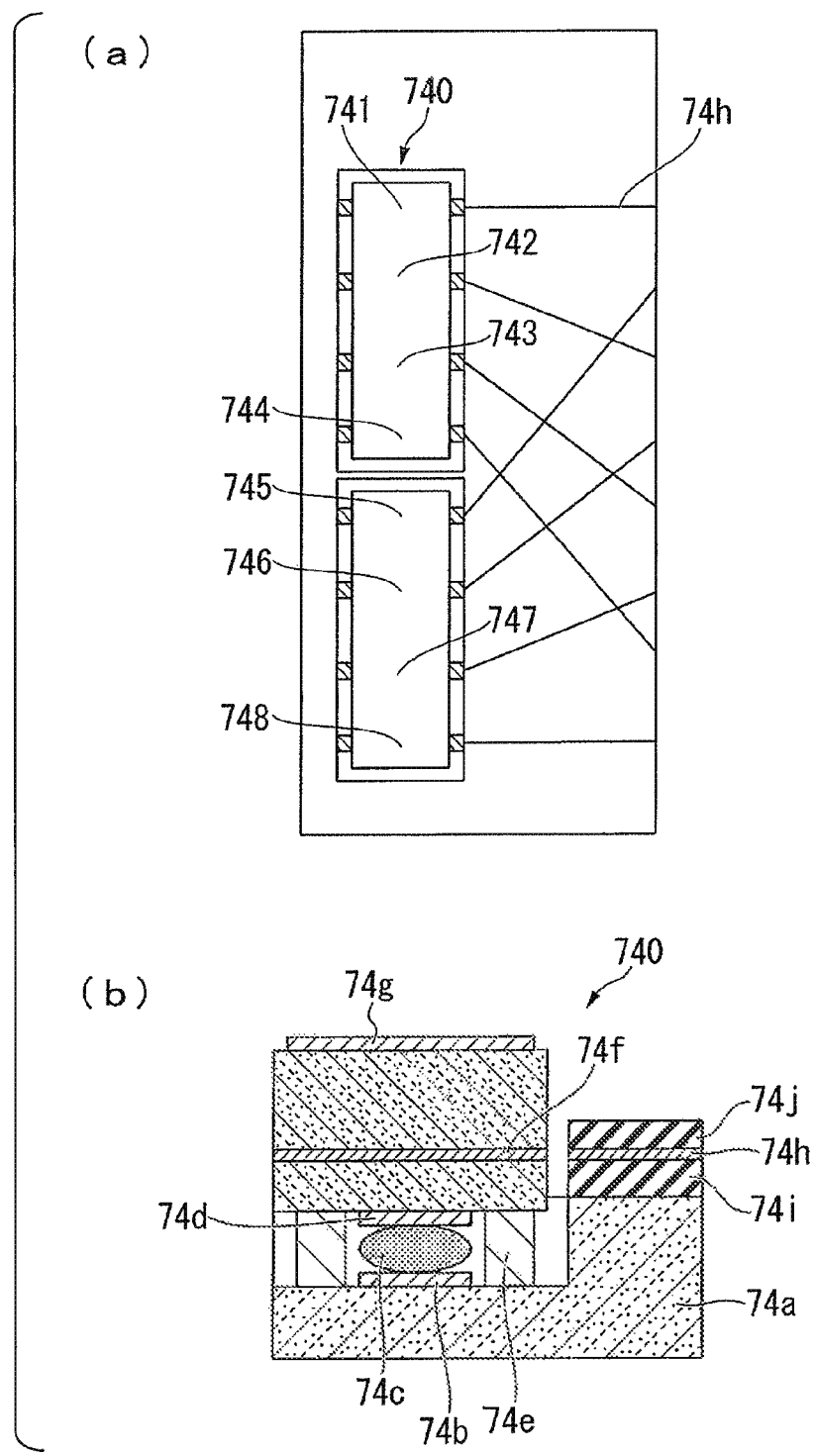
FIG. 17 illustrates the circuit structure of a laser array which is the light-emitting element of the optical element device according to the fifth exemplary embodiment of the present invention, in which FIG. 17 (a) is a schematic plan view, and FIG. 17 (b) is a cross-sectional view taken along the line a-a' of FIG. 17 (a).

Such semiconductor lasers 741 to 748 include a Si substrate 74a, an electrode 74b (on Si substrate), a solder bump 74c, an electrode 74d (lower portion of laser), a Si base 74e, a laser active region 74f, an electrode 74g (upper portion of laser), and the like, as illustrated in FIG. 17.

The first to fourth semiconductor lasers 741 to 744 are integrally formed and therefore share the electrode 74b (on Si substrate) while the fifth to eighth semiconductor lasers 745 to 748 are integrally formed and therefore share the electrode 74b (on Si substrate).

Further, an optical waveguide 74h optically connected to such semiconductor lasers 741 to 748 is formed between a SiO₂ lower cladding layer 74i and a SiO₂ cladding layer 74j on the Si substrate 74a.

Thus, an N×M branching device 531 in the optical transmitter 730 of the fifth exemplary embodiment is formed of four 3 dB couplers 260 as in the case of the optical transmitter 540 mentioned above. However, the first to fourth semiconductor lasers 741 to 744 of the first group are individually optically connected to the first input ports 261 of the first to fourth 3 dB couplers 260, respectively, and the fifth to eighth semiconductor lasers 745 to 748 of the second group are individually optically connected to the second input ports 262 of the first to fourth 3 dB couplers 260, respectively.

In addition, the first to fourth semiconductor lasers 741 to 744 and the fifth to eighth semiconductor lasers 745 to 748 are selectively connected to a driver circuit 511, which is one driving unit, via one change-over switch 541, and a control circuit 520 is connected to the change-over switch 541.

In such a configuration as mentioned above, the optical transmission device 540 of the fifth exemplary embodiment functions in a manner similar to that of the above-mentioned optical transmission device 530 of the fourth exemplary embodiment, or the like. In addition, in the optical transmission device 540, the one driver circuit 511 is always driven, and the control circuit 520 allows the driver circuit 511 to be normally connected to the semiconductor lasers 741 to 714 of the first group through the change-over switch 541.

Thus, four light beams emitted in parallel by the semiconductor lasers 741 to 714 of the first group are branched into eight light beams in parallel by the N×M branching device 531, and the light beams are individually modulated by eight optical modulators 231 to 238.

Therefore, in the optical transmission device 540 of the fifth exemplary embodiment, the semiconductor lasers 741 to 744 and 745 to 748 of the first group and the second group as mentioned above can be switched up to twice corresponding to the number of the groups.

Thus, a probability that the optical transmission device 540 and the optical transmitter 730 of the fifth exemplary embodiment become unusable can be further allowed to be one half that of the optical transmitter of Patent Literature 1, and therefore, the optical transmission device 540 and the optical transmitter 730 of the fifth exemplary embodiment can achieve high redundancy.

In the optical transmission device 540 of the fifth exemplary embodiment, eight optical modulation signals are output as mentioned above, and the eight semiconductor lasers 741 to 748 are divided into the two groups each including four semiconductor lasers, which are integrally formed. Therefore, the productivity and packaging density thereof can be improved.

Figure 18:
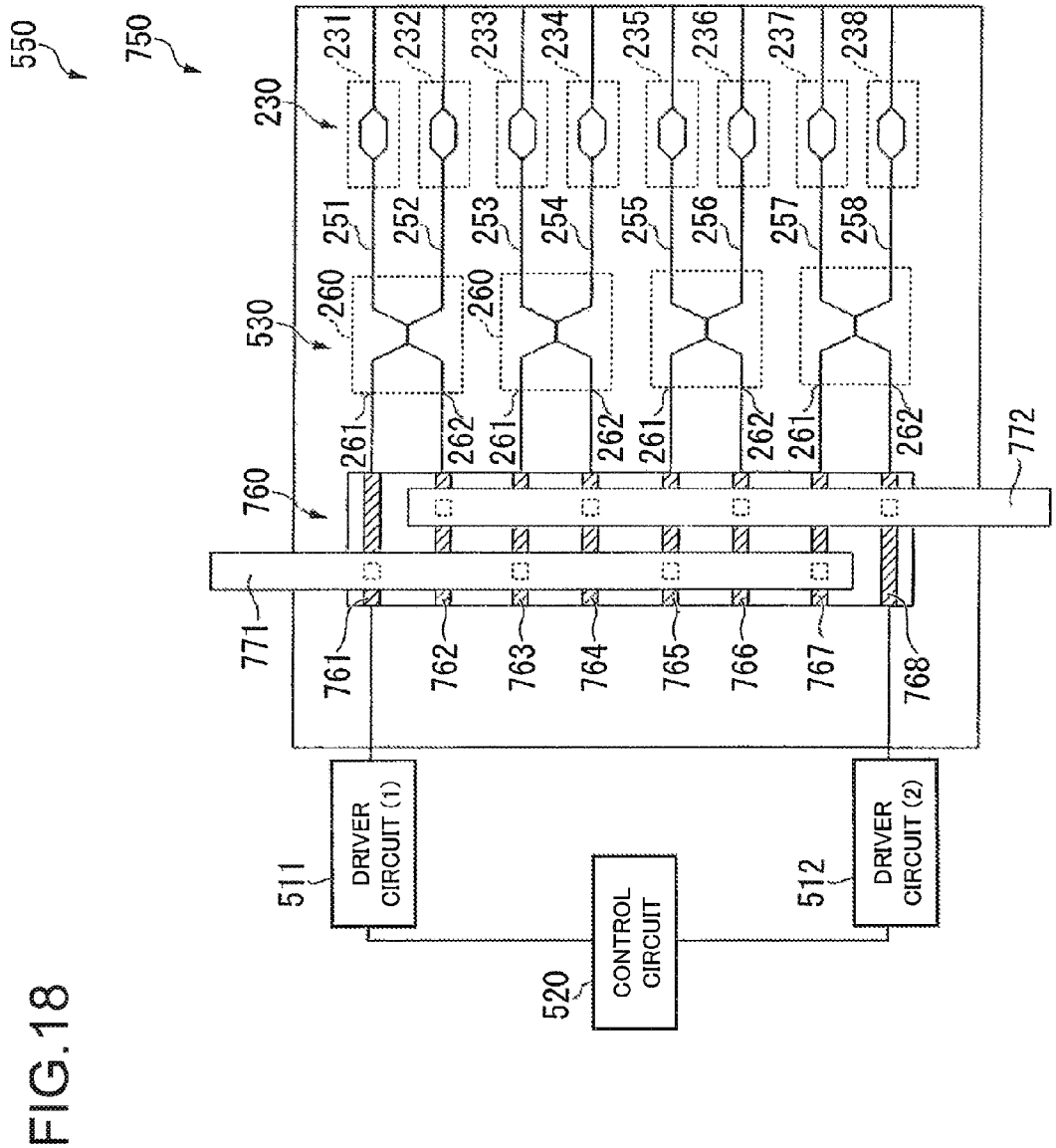
FIG. 18 is a schematic circuit diagram illustrating the structure of an optical element device which is an optical transmitter according to a sixth exemplary embodiment of the present invention.

Next, an optical element device which is an optical transmitter of the sixth exemplary embodiment of the present invention will be explained below with reference to FIG. 18 and FIG. 19. FIG. 18 is a schematic circuit diagram illustrating the structure of the optical element device which is the optical transmitter of the sixth exemplary embodiment, and FIG. 19 (a) and FIG. 19 (b) illustrate the circuit structure of a laser array which is a light-emitting element in the optical element device of the sixth exemplary embodiment, in which FIG. 19 (a) is a schematic plan view, and FIG. 19 (b) is a cross-sectional view taken along the line a-a' of FIG. 19 (a).

The optical transmission device 550 which is also the optical transmitter of the sixth exemplary embodiment includes an optical transmitter 750 as illustrated. A laser array 760 in the optical transmitter 750 of the sixth exemplary embodiment includes semiconductor lasers 761 to 768 which are light-emitting elements of N=8.

However, the eight semiconductor lasers 761 to 768 are divided into two groups of four odd-numbered semiconductor lasers and four even-numbered semiconductor lasers. However, the eight semiconductor lasers 761 to 768 are integrally formed and are divided into the first group and the second group depending on connection of first and second common electrodes 771 and 772.

Such semiconductor lasers 761 to 768 includes a Si substrate 76a, an electrode 76b (on Si substrate), a solder bump 76c, an electrode 76d (lower portion of laser), a Si base 76e, a laser active region 76f, an electrode 76g (upper portion of laser), and the like, as illustrated in FIG. 19 (b).

For example, in the semiconductor lasers 762, 764, 766, and 768 of the second group, the second common electrode 772 and the electrode 76g (upper portion of laser) are electrically connected to each other through a contact hole 761 formed in an insulating layer 76k.

Therefore, the eight semiconductor lasers 761 to 768 are integrally formed and are electrically connected to the first and second common electrodes 771 and 772 through the contact hole 761, whereby the semiconductor lasers are divided into the two groups of the odd-numbered semiconductor lasers and the even-numbered semiconductor lasers.

Further, an optical waveguide 76h optically connected to such semiconductor lasers 761 to 768 is formed between a SiO₂ lower cladding layer 76i and a SiO₂ lower cladding layer 76j on the Si substrate 76a.

An N×M branching device 531 is formed of four 3 dB couplers 260, the four semiconductor lasers 761, 763, 765, and 767 of the first group are individually connected to the first input ports 261 of the first to fourth 3 dB couplers 260, respectively, and the semiconductor lasers 762, 764, 766, and 768 of the second group are individually connected to the second input ports 262 of the first to fourth 3 dB couplers 260, respectively.

In addition, two driver circuits 511 and 512 in a driver array 510 which is a driving unit are individually connected to the two groups of the odd-numbered four semiconductor lasers and the even-numbered four semiconductor lasers of the eight semiconductor lasers 761 to 768.

In such a configuration as mentioned above, the optical transmitter 750 of the sixth exemplary embodiment functions in a manner similar to that of the optical transmitter 200 mentioned above as the second exemplary embodiment, or the like. In addition, in the optical transmission device 550 which is an optical transmitter partially including the optical transmitter 750, a control circuit 520 normally drives the first driver circuit 511 which is one of the two driver circuits 511 and 512 and normally stops the remaining one second driver circuit 512 as a backup.

Therefore, four light beam emitted in parallel by the semiconductor lasers 761, 763, 765, and 767 of the first group, which are normally driven by the first driver circuit 511, are branched into eight light beams in parallel by the N×M branching device 531, and the light beams are individually modulated by eight optical modulators 231 to 238.

Even in the optical transmission device 550 of the sixth exemplary embodiment, the control circuit 520 stops the semiconductor lasers 761, 763, 765, and 767 of the first group, which are normally driven, and starts driving of the semiconductor lasers 762, 764, 766, and 768 of the second group, as backups, which have been stopped, when the output of any of the semiconductor lasers 761, 763, 765, and 767 of the first group is detected decreasing.

Therefore, in the optical transmission device 550 of the sixth exemplary embodiment, the semiconductor lasers 761, 763, 765, and 767 of the first group and the semiconductor lasers 762, 764, 766, and 768 of the second group as mentioned above can be switched up to twice corresponding to the number of the groups.

Thus, a probability that the optical transmission device 550 and the optical transmitter 750 of the sixth exemplary embodiment become unusable can be further allowed to be one half that of the optical transmitter of Patent Literature 1, and therefore, the optical transmission device 550 and the optical transmitter 750 can achieve high redundancy.

In the optical transmission device 550 of the sixth exemplary embodiment, eight optical modulation signals are output as mentioned above, and the eight semiconductor lasers 761 to 768 are integrally formed. Therefore, the productivity and packaging density thereof can be improved.

The present invention is not limited to the first to sixth exemplary embodiments and the alternative examples, described above, but various modifications can be made without departing from the spirit and scope of the present invention. For example, it is exemplified that N=M=$2^n$ (n is a natural number) is satisfied in the optical transmitters 200 and 600 of the second exemplary embodiment, and the like.

Figure 20:
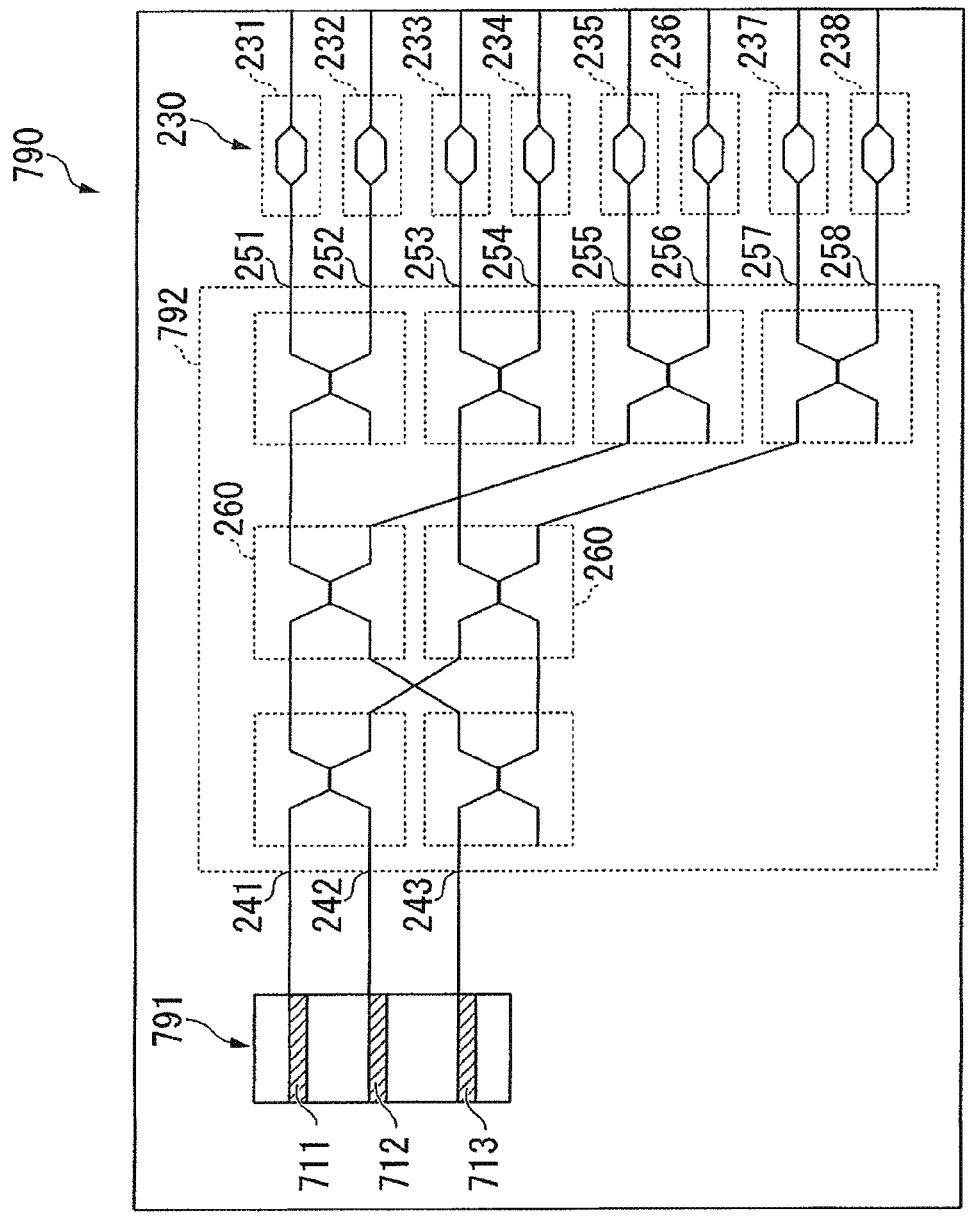
FIG. 20 is a schematic circuit diagram illustrating the structure of an optical element device which is an optical transmitter in an alternative example of the second exemplary embodiment.

Further, in an optical transmitter 790 exemplified, as an alternative example of the second exemplary embodiment, in FIG. 20, a laser array 791 includes semiconductor lasers 711 to 713 which are three light-emitting elements of which the number is not N. Thus, a 3×8 branching device 792 which is an N×M branching device is formed of two first-stage, two second-stage, and four third-stage 3 dB couplers 260.

Therefore, the semiconductor laser 711 is not connected to the second input port 262 of the second 3 dB coupler 260 of the first step. Such an optical transmitter 790 also functions in a manner similar to that of the optical transmitter 200 of the second exemplary embodiment, or the like.

In addition, a probability that the optical transmitter 790 becomes unusable can be further allowed to be one third that of the optical transmitter of Patent Literature 1. Thus, a probability that the optical transmitter 790 becomes unusable can be further allowed to be one half that of the optical transmitter of Patent Literature 1, and therefore, the optical transmitter 790 can achieve high redundancy.

Figure 21:
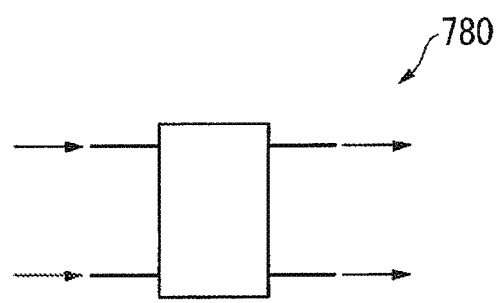
FIG. 21 is a schematic circuit diagram illustrating the structure of a multimode interference coupler type 3 dB coupler which is a 2×2 branching device that forms an N×M branching device of an alternative example of an optical transmitter in an alternative example of the second exemplary embodiment of the present invention.
Figure 22:
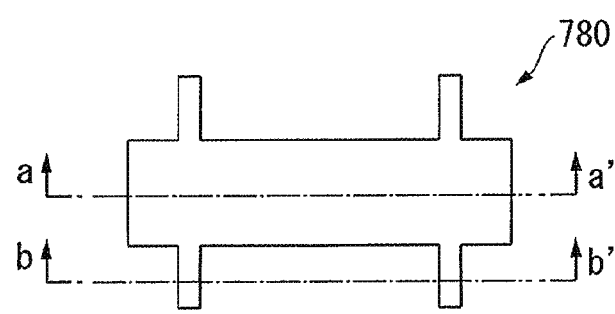
FIG. 22 is a schematic plan view illustrating the circuit structure of the multimode interference coupler type 3 dB coupler of the alternative example of the optical transmitter in the alternative example of the second exemplary embodiment of the present invention.

In addition, it is exemplified that the 2×2 branching device is formed of a directional coupler type 3 dB coupler 260 in the optical transmitter 200 of the second exemplary embodiment, or the like. Further, in an alternative example of the second exemplary embodiment, a 2×2 branching device may be formed of a multimode interference coupling type 3 dB coupler 780 as illustrated in FIG. 21 to FIG. 23.

Figure 23:
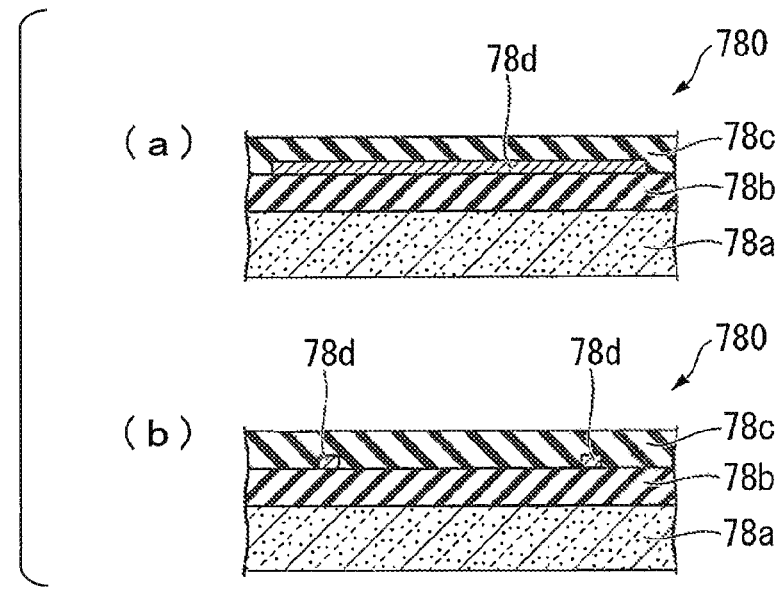
FIG. 23 illustrates the inner structure of the multimode interference coupler type 3 dB coupler of the alternative example of the optical transmitter in the alternative example of the second exemplary embodiment of the present invention, in which FIG. 23 (a) is a cross-sectional view taken along the line a-a' of FIG. 22, and FIG. 23 (b) is a cross-sectional view taken along the line b-b' of FIG. 22.

Such a 3 dB coupler 780 includes, for example, a Si substrate 78a, a SiO$_2$ lower cladding layer 78b, and a Si slab optical waveguide 78c as illustrated in FIG. 23.

Figure 24:
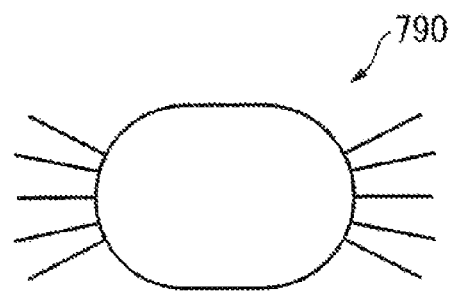
FIG. 24 is a schematic circuit diagram illustrating the structure of an N×M star coupler that forms the N×M branching device of the alternative example of the optical transmitter in the alternative example of the second exemplary embodiment of the present invention.

Further, it is exemplified that the N×M branching device is formed of the plural 3 dB couplers 260 in the optical transmitter 200 of the second exemplary embodiment, or the like. Further, in an alternative example of the second exemplary embodiment, an N×M branching device may be formed of an N×M star coupler 810 as illustrated in FIG. 24.

Figure 25:
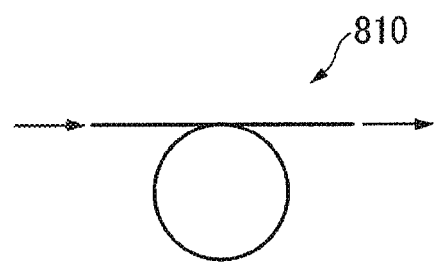
FIG. 25 is a schematic circuit diagram illustrating the structure of a ring optical modulator of an alternative example of the optical transmitter in the alternative example of the second exemplary embodiment of the present invention.

In addition, it is exemplified that the optical modulators 231 to 238 are formed in MZI form in the optical transmitter 200 of the second exemplary embodiment, or the like. Further, in an alternative example of the second exemplary embodiment, an optical waveguide may be formed in one-ring form in an optical modulator 820 as illustrated in FIG. 25 to FIG. 27.

Figure 26:
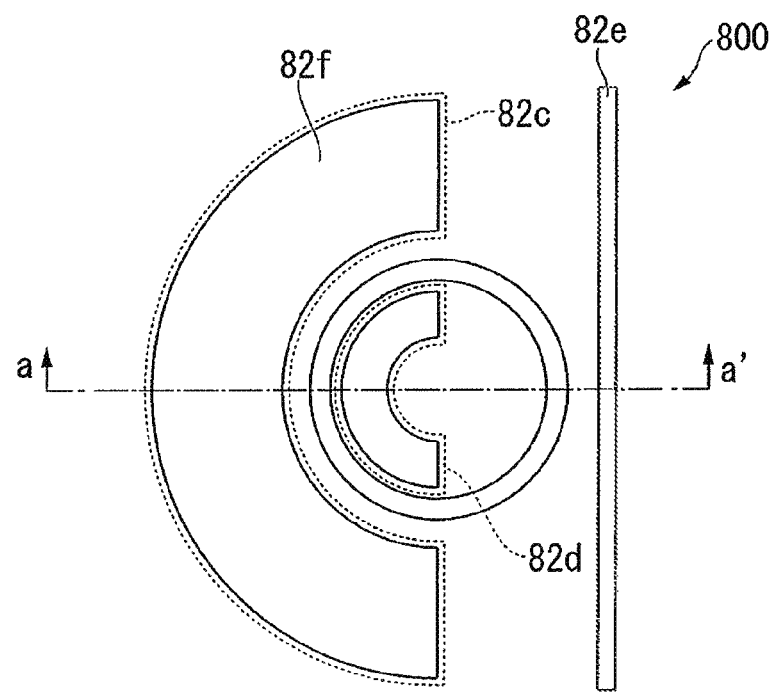
FIG. 26 is a schematic plan view illustrating the circuit structure of the ring optical modulator of the alternative example of the optical transmitter in the alternative example of the second exemplary embodiment of the present invention.
Figure 27:
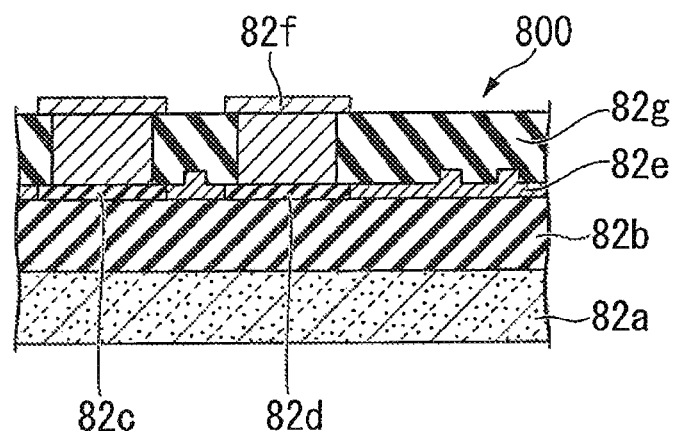
FIG. 27 is a cross-sectional view that illustrates the inner structure of the ring optical modulator of the alternative example of the optical transmitter in the alternative example of the second exemplary embodiment of the present invention and that is taken along the line a-a' of FIG. 26.

Such an optical modulator 820 in ring form includes, for example, a Si substrate 82a, a SiO$_2$ lower cladding layer 82b, an n+_Si unit 82c, a p+_Si unit 82d, a Si optical waveguide 82e, an electrode 82f, and a SiO$_2$ upper cladding layer 82g as illustrated in FIG. 26 and FIG. 27 in an alternative example of the second exemplary embodiment.

In general, an N×M branching device can be realized in a structure, in which 3 dB couplers 260 of which the number is $2^n-1 \times n$ are connected in a matrix, or a portion thereof, in the case of N≤M and M=$2^n$ (n is a natural number).

Figure 28:
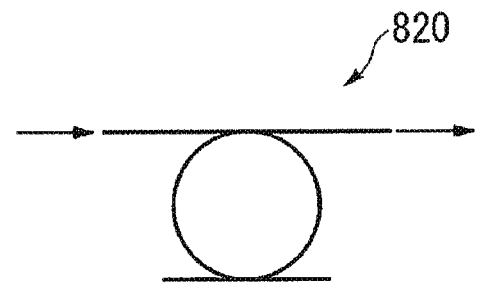
FIG. 28 is a schematic circuit diagram illustrating the structure of the ring optical modulator of the alternative example of the optical transmitter in the alternative example of the second exemplary embodiment of the present invention.
Figure 29:
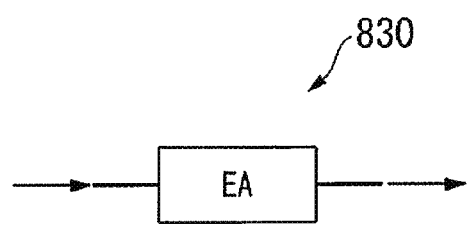
FIG. 29 is a schematic block diagram illustrating the structure of an electro-absorption type optical modulator of an alternative example of the optical transmitter in the alternative example of the second exemplary embodiment of the present invention.

Similarly, in alternative examples of the second exemplary embodiment, an optical modulator may be formed in an optical modulator 830 in ring form, in which optical waveguides are two, as illustrated in FIG. 28, and may be formed in an electro-absorption type optical modulator 840 as illustrated in FIG. 29.

Further, it is exemplified that the ath semiconductor laser 21a which is normally driven and the (a+1)th semiconductor laser 21(a+1) which is normally stopped satisfy $$|\lambda 1-\lambda 2|\geq (w1+w2)/2$$

as indicated in FIG. 11 and FIG. 12, and the output of the ath semiconductor laser 21a which is normally driven is decreased to zero (0) with time and the output of the (a+1)th semiconductor laser 21(a+1), as a backup, which has been stopped is increased from zero (0) to P2 with time when the output of a light beam from the ath semiconductor laser 21a which is normally driven is detected decreasing from P2 to P1, in the optical transmission device 500 of the second exemplary embodiment, or the like.

Figure 30:
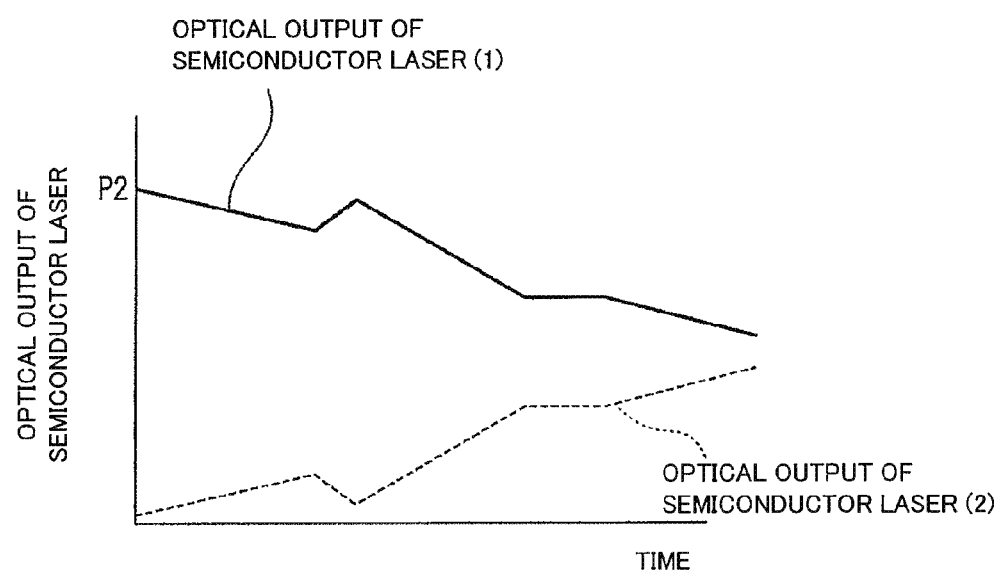
FIG. 30 is a characteristic diagram indicating the variations with time of the outputs of a first semiconductor laser and a second semiconductor laser of an alternative example of the optical transmitter in the alternative example of the second exemplary embodiment of the present invention.

However, in an alternative example of the second exemplary embodiment, when the decrease of the output of an ath semiconductor laser 21a which is normally driven is detected by a detector array 290, the driving of the ath semiconductor laser 21a of which the decrease of the output is detected and of an (a+1)th semiconductor laser 21(a+1), as a backup, which shares the output ports of a 3×8 branching device 792 and has been stopped, may be controlled to changelessly complement the outputs of light beams emitted from the shared output ports, as indicated in FIG. 30, In this case, the lower limit of the output of a light beam from the ath semiconductor laser 21a which is normally driven is P1, and the normal output thereof is P2; and when the output of a light beam from the ath semiconductor laser 21a which is normally driven is detected decreasing from P2 to P1, the output of the (a+1)th semiconductor laser 21(a+1), as a backup, which has been stopped, is controlled to allow the total output of light beams emitted from the shared output ports to be P2.

It is exemplified that the plural semiconductor lasers 211 to 218, the plural 3 dB couplers 260, and the plural optical modulators 231 to 238 are integrated on the silicon substrate 201, which is one semiconductor substrate, in the optical transmitter 200 of the embodiment described above, and the like. However, the semiconductor lasers 211 to 218 may be exchangeably formed (not illustrated).

This application claims the priority based on Japanese Patent Application No. 2012-168219, which was filed in Japan on Jul. 30, 2012 and the content of which is incorporated herein.

INDUSTRIAL APPLICABILITY

In accordance with the present invention, it is applicable to provide an optical transmitter that can achieve high redundancy.

REFERENCE SIGNS LIST

10 Optical communication device
100 Optical transmitter
111 to 11N Light-emitting element
120 N×M branching device
131 to 13M Optical modulator
141 to 14N Input port
151 to 15M Output port
200 Optical transmitter
201 Silicon substrate as semiconductor substrate
211 to 218 Semiconductor laser as light-emitting element
220 8×8 branching device as N×M branching device
231 to 238 Optical modulator
241 to 248 Input port
251 to 258 Output port
260 3 dB Coupler as 2×2 branching device
290 Detector array as monitoring unit
291 to 298 Photodetector
301 to 308 Optical waveguide
401 to 408 Optical receiver
500 Optical transmission device as optical transmitter
510 Driver array as driving unit
511 to 518 Driver circuit
520 Control circuit as control unit
530 Optical transmission device as optical transmitter
531 N×M branching device
540 Optical transmission device as optical transmitter
550 Optical transmission device as optical transmitter
600 Optical transmitter
601 2×2 Branching device as N×M branching device
610 Optical transmitter
611 4×4 Branching device as N×M branching device
720 Optical transmitter
730 Optical transmitter
741 to 748 Semiconductor laser as light-emitting element
750 Optical transmitter
761 to 768 Semiconductor laser as light-emitting element
790 Optical transmitter
792 3×8 Branching device as N×M branching device
800 3 dB Coupler as 2×2 branching device
810 N×M star coupler as N×M branching device
820 Optical modulator
830 Optical modulator
840 Optical modulator

What is claimed is:

1. An optical transmitter comprising:
at least two light-emitting elements that emits beams;
a branching device comprising input ports on which beams emitted by the light-emitting elements are incident and output ports for branching beams, incident on the input ports, into at least two beams and for emitting the beams;
optical modulators that individually modulates beams emitted from the output ports, wherein
the number of the light-emitting elements is N (N is a natural number of 2 or more);
the branching device comprises an N×M branching device for individually branching beams incident from some of the N light-emitting elements to some of N input ports and for emitting the beams in parallel from M (M is a natural number of 2 or more) output ports; and
the number of the optical modulators is M, and the optical modulators individually modulate beams individually incident from the M output ports;
a monitoring unit for individually monitoring presence or absence of malfunction of the N light-emitting elements; and
a control unit that:
normally drives some of the N light-emitting elements in the driving unit and normally stops the remaining light-emitting elements as backups;
stops driving of the light-emitting elements, which are normally driven by the driving unit and of which decrease of the outputs is detected by the monitoring unit; and
starts driving of at least some of the light-emitting elements stopped due to the decrease of the outputs and of the stopped light-emitting elements, as backups, sharing the output ports of the N×M branching device.

2. The optical transmitter according to claim 1, wherein the driving unit individually drives the N light-emitting elements.

3. The optical transmitter according to claim 1, wherein the driving unit individually drives the N light-emitting elements which are divided into L (L is a natural number of 2 or more and N or less) groups.

4. The optical transmitter according to claim 1, wherein assuming that the center wavelength of the light-emitting element which is normally driven is $\lambda 1$, the full-width at half maximum of the wavelength spectrum of the light-emitting element is $w1$, the center wavelength of the light-emitting element which is normally stopped is $\lambda 2$, and the full-width at half maximum of the wavelength spectrum of the light-emitting element is $w2$, $|\lambda 1-\lambda 2|(w1+w2)/2$ is satisfied, the lower limit of the output of a beam from the light-emitting element which is normally driven is P1, the normal output thereof is P2, and
the control unit decreases the output of the light-emitting element, which is normally driven, to zero (0) with time and increases the output of the light-emitting element, as a backup, which has been stopped, from zero (0) to P2 with time, when the output of a beam from the light-emitting element which is normally driven is detected decreasing from P2 to P1.

5. The optical transmitter according to claim 1, wherein the monitoring unit comprises a photodetector that detects beams transmitted from the light-emitting elements to the input ports of the N×M branching device.

6. The optical transmitter according to claim 1, wherein the light-emitting element comprises a semiconductor laser comprising a leakage port, through which a leakage beam leaks, in a side opposite to a port for emission of a beam to the N×M branching device; and
the monitoring unit comprises a photodetector that detects the output of the beam based on the output of the leakage beam leaking from a leakage port of the light-emitting element.

7. The optical transmitter according to claim 1, wherein the N×M branching device is formed of at least one 2×2 branching device.

8. The optical transmitter according to claim 7, wherein the N×M branching device is formed of a plurality of 2×2 branching devices connected in a matrix.

9. An optical transmitter comprising:
at least two light-emitting elements that emits beams;
a branching device comprising input ports on which beams emitted by the light-emitting elements are incident and output ports for branching beams, incident on the input ports, into at least two beams and for emitting the beams; and
optical modulators that individually modulates beams emitted from the output ports, wherein
the number of the light-emitting elements is N (N is a natural number of 2 or more);
the branching device comprises an N×M branching device for individually branching beams incident from some of the N light-emitting elements to some of N input ports and for emitting the beams in parallel from M (M is a natural number of 2 or more) output ports; and
the number of the optical modulators is M, and the optical modulators individually modulate beams individually incident from the M output ports;
a monitoring unit for individually monitoring presence or absence of malfunction of the N light-emitting elements; and
a control unit for:
normally drives some of the N light-emitting elements by the driving unit and normally stops the remaining light-emitting elements as backups;
controls driving of at least some of the light-emitting elements, of which decrease of the outputs is detected, and of the stopped light-emitting elements, as backups, sharing the output ports of the N×M branching device when the decrease of the outputs of the light-emitting elements normally driven by the driving unit is detected by the monitoring unit; and
changelessly complements the outputs of beams emitted from the shared output ports.

10. The optical transmitter according to claim 9, wherein the lower limit of the output of a beam from the light-emitting element which is normally driven is P1, the normal output thereof is P2, and
the control unit controls the output of the stopped light-emitting element as a backup to allow the total output of beams emitted from the shared output ports to be P2 when the output of a beam from the light-emitting element which is normally driven is detected decreasing from P2 to P1.

11. The optical transmitter according to claim 9, wherein the N light-emitting elements, the N×M branching device, and the M optical modulators are integrated on one semiconductor substrate.

12. An optical communication device comprising:
the optical transmitter according to claim 9,
M optical waveguides that transmits beams, individually emitted from the M optical modulators of the optical transmitter, in parallel; and
an optical receiver that receives M beams in parallel from the M optical waveguides.

13. The optical transmitter according to claim 9, wherein the driving unit individually drives the N light-emitting elements.

14. The optical transmitter according to claim 9, wherein the driving unit individually drives the N light-emitting elements which are divided into L (L is a natural number of 2 or more and N or less) groups.

15. The optical transmitter according to claim 9, wherein the monitoring unit comprises a photodetector that detects beams transmitted from the light-emitting elements to the input ports of the N×M branching device.

16. The optical transmitter according to claim 9, wherein
the light-emitting element comprises a semiconductor laser comprising a leakage port, through which a leakage beam leaks, in a side opposite to a port for emission of a beam to the N×M branching device; and
the monitoring unit comprises a photodetector that detects the output of the beam based on the output of the leakage beam leaking from a leakage port of the light-emitting element.

17. The optical transmitter according to claim 9, wherein the N×M branching device is formed of at least one 2×2 branching device.

18. The optical transmitter according to claim 17, wherein the N×M branching device is formed of a plurality of 2×2 branching devices connected in a matrix.

19. An optical transmitting method comprising:
emitting beams from at least two light-emitting elements;
branching, by a branching device, the emitted beams into at least two beams and emitting the branched beams;
individually modulating, by optical modulators, the branched beams, wherein
the number of the light-emitting elements is N (N is a natural number of 2 or more);
the branching device comprises an N×M branching device for individually branching beams incident from some of the N light-emitting elements to some of N input ports and for emitting the beams in parallel from M (M is a natural number of 2 or more) output ports; and
the number of the optical modulators is M, and the optical modulators individually modulate beams individually incident from the M output ports;
individually monitoring, by a modulating unit, presence or absence of malfunction of the N light-emitting elements;
normally driving, by a control unit, some of the N light-emitting elements by the driving unit and normally stops the remaining light-emitting elements as backups;
controlling, by the control unit, driving of at least some of the light-emitting elements, of which decrease of the outputs is detected, and of the stopped light-emitting elements, as backups, sharing the output ports of the N×M branching device when the decrease of the outputs of the light-emitting elements normally driven by the driving unit is detected by the monitoring unit; and
changelessly complementing, by the control unit, the outputs of beams emitted from the shared output ports.

* * * * *